United States Patent [19]
Degeneff et al.

[11] Patent Number: 5,604,423
[45] Date of Patent: Feb. 18, 1997

[54] TAP CHANGING SYSTEM HAVING DISCRETE CYCLE MODULATION AND FAULT ROTATION FOR COUPLING TO AN INDUCTIVE DEVICE

[75] Inventors: Robert C. Degeneff, Niskayuna, N.Y.; Friedrich K. Schaeffer; Robert H. Frazer, both of Goldsboro, N.C.; David A. Torrey, Ballston Lake; Osman Demirci, Troy, both of N.Y.

[73] Assignee: Utility Systems Technologies, Inc., Niskayuna, N.Y.

[21] Appl. No.: 223,900

[22] Filed: Apr. 6, 1995

Related U.S. Application Data

[63] Continuation-in-part of Ser. No. 966,544, Oct. 26, 1992, abandoned.

[51] Int. Cl.$^6$ .................................................. G05F 1/16
[52] U.S. Cl. ............................................. 323/258; 323/343
[58] Field of Search ............................ ; 323/257, 258, 323/343, 345; 361/35, 38; G05F 1/20

[56] References Cited

U.S. PATENT DOCUMENTS

| | | |
|---|---|---|
| 3,195,038 | 7/1965 | Fry . |
| 3,319,153 | 5/1967 | Livingston . |
| 3,461,378 | 8/1969 | King . |
| 3,600,664 | 8/1971 | Goldberg et al. ................. 323/263 |
| 3,684,949 | 8/1972 | Yamachi et al. .................. 323/263 |
| 3,700,925 | 10/1972 | Wood ............................... 327/461 |
| 3,786,337 | 1/1974 | Kugler ............................. 323/343 |
| 3,909,697 | 9/1975 | Depenbrock ...................... 323/126 |
| 4,135,126 | 1/1979 | Rubashev et al. ................. 323/343 |
| 4,220,911 | 9/1980 | Rosa ................................. 323/343 |
| 5,408,171 | 4/1995 | Eitzmann et al. ................. 323/258 |

*Primary Examiner*—Jeffrey L. Sterrett
*Attorney, Agent, or Firm*—Heslin & Rothenberg, P.C.

[57] ABSTRACT

A tap changing system for operation with a transformer and featuring a special group of gate-controlled electronic devices that operate as a circuit breaker and recloser such that, after half-cycle of short-circuit current, said special group is transferred to the OFF-state, whereby the tap changer winding is open circuited; the advantage being that only the special group of devices need be rated to sustain short-circuit conditions; a further feature is the concept of Discrete-Cycle Modulation (DCM) whereby tap voltage magnitudes are obtainable in increments intermediate the physical tap winding voltage magnitudes.

51 Claims, 14 Drawing Sheets

TAP CHANGING SYSTEM HAVING DISCRETE CYCLE MODULATION AND FAULT ROTATION FOR COUPLING TO AN INDUCTIVE DEVICE

This application is a continuation-in-part of application Ser. No. 07/966,544 filed on Oct. 26, 1995 now abandoned, the benefit of whose filing date is herewith claimed.

BACKGROUND OF THE INVENTION

This invention relates to tap changers for electrical inductive equipment. Tap changing is used extensively in a wide variety of electrical inductive apparatus such as AC voltage regulating transformers, HVDC rectifier and inverter transformers and phase angle regulators to adjust the devices turns ratio or phase angle while the-device is serving load. Most of the tap changing methods in use utilize a switching means to alternately connect various sections of one winding of the electrical inductive apparatus into a circuit. One extensively used switching means is a mechanical contact switch in which a movable contact selectively engages stationary contacts connected to various sections of the winding so as to connect varying numbers of turns into the circuit. This methodology is at present used to the virtual exclusion of all other methods in large power apparatus.

Another type of switching means, which has been the subject of patents activity and technical papers with increasing frequency due to its fast response time and lack of mechanical wear, is the electronic switch. Electronic switches are typically electronically controlled gate devices, such as thyristors and gate turn off devices, which are connected as an inverse parallel-connected pair to each tap of a winding, as shown in U.S. Pat. No. 3,195,038. A control device triggers predetermined groups of the thyristor pairs to connect or bypass certain ones of the tap winding sections and thereby provide a range of individual output voltage increments for an electrical inductive apparatus. The total number of discrete voltage increments may be extended, as shown in the above referenced patent, by utilizing additional thyristor pairs with each winding section to reconfigure the relative polarity of the winding sections and thereby dispose each winding section in additive or opposing relation with the remainder of the winding sections. Further, tapped secondary windings may be utilized with appropriate switching devices to increase the tap range of the electrical inductive apparatus as shown in U.S. Pat. Nos. 3,195,038, 3,909,697, and also 3,700,925.

Several of the prime considerations affecting economical usage of solid-state tap changers in electrical inductive apparatus are the total number of electrical switches, their individual ratings, their associated losses, and the number of individual winding sections within the inductive device required to provide a predetermined number of output voltage increments within the total output voltage range of the electrical inductive apparatus. Obviously, the cost of the tap changer mechanism may be reduced if fewer thyristor switches of lower rating are use with a simpler winding configuration. Prior art electronic tap changing arrangements have certain drawbacks regarding these considerations since they require an excessive number of switches and individual winding sections to provide a large number of discrete output voltage increments required in commercial applications of such electrical inductive apparatus. Due to the extreme cost none of the proposed arrangements for controllable electronic tap changers were at any time placed into commercial operation in large power equipment.

Efforts have been made to address this uneconomical condition with the use of phase control, as taught in U.S. Pat. No. 4,220,911, but this configuration produces unacceptably high levels of harmonics and as such is unacceptable practically since filters or other methods of mitigating the effect of these parasitic harmonics must be used, Other approaches, such as those described in U.S. Pat. Nos. 4,135,126, 3,786,337, 3,319,153, 3,600,664, 3,684,949, and 3,461,378 have likewise not proved satisfactory. At present there is still no commercially viable arrangement, of any form, that makes the solid-state tap changer economically attractive for commercial use.

Thus, it is desirable to provide an electrical inductive apparatus which has an improved tap changing means which provides a commercially acceptable number of output voltage increments through the use of a reduced number of individual switch devices having lower ratings, a simpler and less costly tap winding structure, and a control logic which makes the most efficient use of the ratings of the electronic components.

An objective of the present invention is to provide a completely non mechanical contact switching device having a high speed of response and high reliability, as well as economical cost. Another objective of the invention is to provide reliable operation and switching independent of the nature of the load at any moment in time. Another objective of the invention is to provide reliable switching action between any two tap settings including switching taps sequentially or selectively over the entire tap range. It is also the objective of this invention to design the control so that the switch can be operated such that the output RMS voltage is controllable and selectable between the distinct voltage increments dictated by the winding configuration. An additional objective of this invention is to use the switch as a device to limit the duration of the fault current through the apparatus and the switch itself so that the device rating and cost of the device be reduced significantly.

SUMMARY OF THE INVENTION

Accordingly, it is the primary object of this invention to provide a load tap changer which achieves the stated objectives and is economical to construct. This is accomplished by reducing the number and required rating of the controllable electronic devices required to provide the desired voltages. This is achieved by using three complementary techniques. First, this invention teaches that the rating of the controllable electronic device can be considerably reduced if these devices are required to withstand only a portion of the short-circuit duty an apparatus normally experiences during fault or inrush. This is accomplished by using the speed of the electronic switch to change the topology of the network when an unacceptable condition is recognized, Heretofore, controllable electronic tap arrangements were designed to withstand whatever overcurrent the system delivered for the full period of the overcurrent event, and as such, required arrangements which were extremely expensive. Secondly, a winding arrangement is used which more efficiently exploits the ratings of the electronic components. Thirdly, voltages intermediate to the tapped winding sections can be achieved, as taught in this invention, by selectively gating the controllable electronic switches and achieving an RMS voltage in time with the desired level.

This invention also embodies other capabilities inherent in solid state devices and transformer and controls design. These include, but are not limited to, the ability to control voltage and current independently on each phase of a multi-phase device, thereby achieving a desired distribution of load current on each transmission conductor which could be used to reduce the electromagnetic fields associated with electric power distribution systems, the ability to control power during load pick-up, inrush, the ability to control or mitigate solar induced currents (GIC), cold starts, and transient overload conditions to mitigate the effect on the power transformer.

A further feature of the present invention is the concept of discrete-cycle modulation (DCM) which operates to enhance or extend the previous time sharing feature of the invention already disclosed in the parent application, discrete-cycle modulation or DCM being unique to the present CIP application.

The concept of discrete-cycle modulation is based on using a limited number of transformer tap windings, but involving time-sharing, preferably sequential, of conductive states of selected tap windings by actuation of their associated switches, so as to synthesize precise intermediate RMS output voltages. This is accomplished by approximately switching one or more tap windings in and out on a precisely time-controlled basis over multiple cycles of two or more, so that the magnitude of the RMS transformer output voltage varies as desired. As before, switching of one or more tap windings is effectuated by switching control signals selectively transmitted to the gates of a set of switches in a switching configuration. It is to be noted that in accordance with a preferred embodiment, the tap switch gating signals are synchronized to occur prior to or at zero crossings of the line current. By performing the tap switching only at zero crossings, harmonic distortion minimized, and the device can synthesize a wide range of voltage increments, within any given tap range of an inductive device, with a reduced number of physical taps.

DESCRIPTION OF PREFERRED EMBODIMENTS

Figure 1:
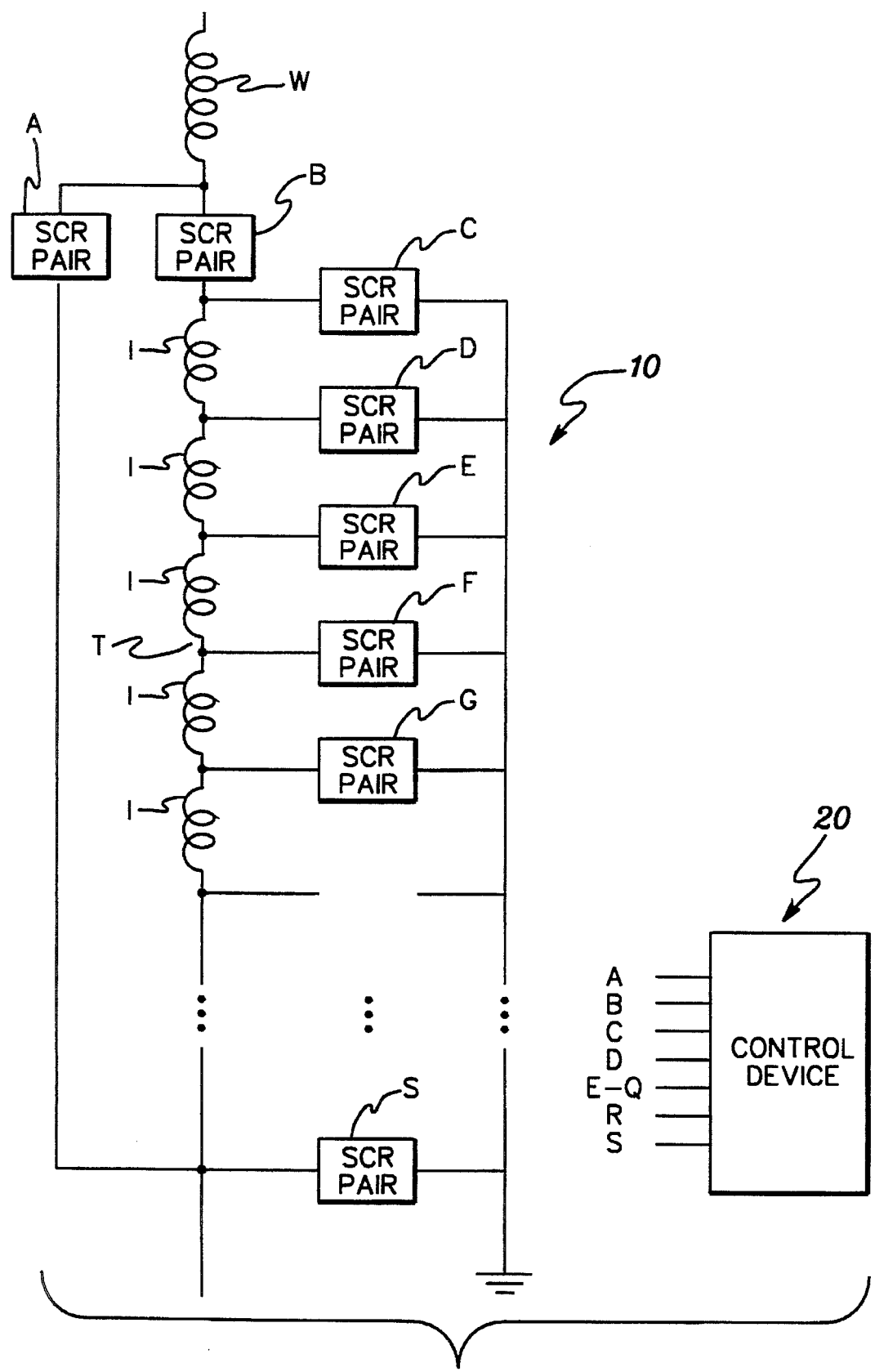
FIG. 1 depicts a tap changer of the prior art having a standard tap winding arrangement with fully rated thyristors to address the short-circuit duty of the transformer. This Figure also illustrates the tap winding reversing arrangement accomplished with thyristors.

Before proceeding with the description of the preferred embodiments, reference shall first be made to FIG. 1 in which a solid state tap changer 10 involving the use of groups of thyristor devices is illustrated. This is the solid state tap changer constituting an extension or enhancement of the previously mentioned mechanical load tap changer which was described in detail in U.S. Pat. No. 3,195,038.

It should be noted in FIG. 1, that thyristor pairs A and B are so connected that they allow reversing of the turns in the tap winding; that is to say, turns can be added or subtracted by current flow in respectively opposite directions. Accordingly, if zero additional turns were desired, thyristor groups B and C would have control signals sent from control device 20 to the gates of the back-to-back pair of thyristors in each of the blocks designated B and C. As can be understood, current would flow through the thyristors in the groups B and C and thence to reference potential (ground) in the tap changer 10. To add a single tap the control device (20) would send gating signals to thyristor groups B and D. To obtain a reduction of a single tap the control would apply control signals to the thyristor groups A and R. Correspondingly, for subtracting two taps (windings shown having a value of 1) thyristor pairs A and Q would be provided control signals, and for subtracting three taps, it would be groups A and P, etc.

As will be appreciated, the control device 20 functions responsive to input control line 22, to provide the control signals to the gates of the thyristor back-to-back pair groups A–S at the proper time to accomplish the desired turns ratio. In the particular showing of FIG. 1, the control is accomplished electrically by extending the output control lines A–S, seen on the left side of control device 20, to the respective gates of each thyristor pair of the groups. This effect can also be accomplished optically or by other suitable means.

Conventional power systems tap changers are normally designed for plus or minus 16 steps or taps with each tap step being approximately ⅝%. If this is the assumed arrangement for the tap changer 10 in FIG. 1, then 19 back-to-back thyristor pairs would be required. Each of these 19 pairs would have to be rated for the full short-circuit current the system would deliver when limited only by the impedance of the inductive device. From this it will be appreciated that the cost of this conventional configuration or arrangement is substantial since each of the thyristors has to be rated to carry the short-circuit current limited only by the impedance of the transformer for the length of time dictated by ANSI standards. This is very complex, but, in general, class III transformers may be required to withstand a fully offset short-circuit current for at least I second. Users can and do specify other duties including 1 second on, x seconds off, and 1 second on again.

It will be understood that, although the FIG. 1 embodiment shows a transformer, and reference will be made hereinafter to transformers, that other types of inductive devices, such as voltage or current regulations and the like, can be utilized with the present invention.

Figure 2:
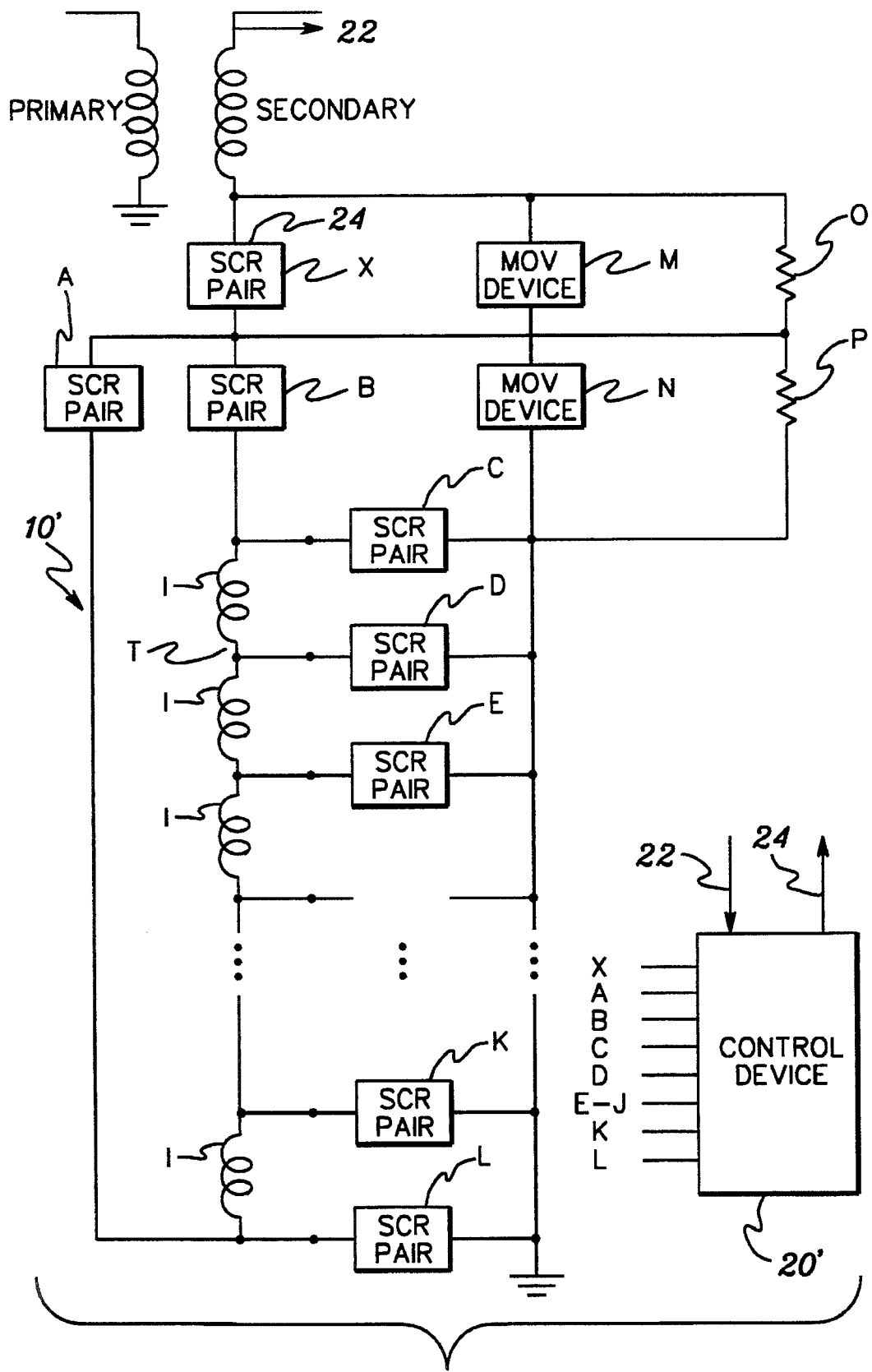
FIG. 2 depicts a configuration in accordance with the present invention, featuring a specially chosen second group of controllable electronic devices functioning as a circuit breaker.

In contrast to the prior art shown in FIG. 1, FIG. 2 represents a preferred embodiment of the present invention, which involves limiting the current through the tap changing mechanism during short-circuit fault by the addition of another controllable electronic device; that is, a separate second group of thyristors. FIG. 2 is similar to FIG. 1 in that the tap windings are connected to the main windings of the transformer with controllable electronic switches and these switches are activated with a control (20') analogous to control device (20) in FIG. 1. However, the additional group of controllable electronic devices, group X, has been added between the tap winding T and the main winding S. This additional group of controllable electronic switches is controlled so that after a predetermined high level of fault over-current is detected by input control line 22 connected to control device 20' from the transformer secondary S, group X is gate off by means of output control line 24 from control device 20' to the gates of the group X thyristors. The term "over-current" is used herein to denote a level of current approaching a full short circuit condition.

Group X can take the form of a normal thyristor which stops conducting at the next current zero after gating signals are stopped or, alternately, a gate turnoff device which forces the current to zero based upon some control logic. As an example, if during a fault the current through the apparatus and tap windings reach a level deemed too large, the gating signal to group X is interrupted and at the next current zero the thyristor stops passing current.

Alternately, the device using a GTO's (gated turn off devices) can be used to force the current to zero at any time within the half-cycle during which the current through the tap winding(s) exceeds preset limits. Fault duration in this embodiment is limited to the speed with which the over-current can be detected and the required signal can be delivered to the control. One skilled in the art will recognize that the GTO controlled device can also be gate appropriately to commutate the power flow in one or all of the windings, allowing the transformer to remain on line during a fault or transient overload condition until the system control provides a signal to gate it offline or the transient overload condition is over.

The effect of this is to open circuit the apparatus secondary winding "S" and to limit the short-circuit current after the first half-cycle to zero. The voltage across electronic device X is then determined by the winding and the type of fault encountered and the system X/R ratio (reactance to resistance ratio). Consequently, the breaker controllable electronic switch group X, must be rated to withstand the subsequent open circuit voltage of the secondary winding. This, however, is a more economical arrangement than that of ensuring that all controllable electronic switches in the tap arrangement can carry the fault current for the full length of the system fault.

In FIG. 2 group X is located between the secondary winding and the tap winding. This additional controllable electronic group may also be located at the line end, the neutral, or distributed throughout the tap winding itself. The selection of its location will not affect its stated function, which is to provide a method to allow the reduction of the rating of the controllable electronic switches in the tap changing mechanism. FIG. 2 illustrates a solidly grounded winding but the method presented here applies equally well to a delta winding and other windings of more complex configuration.

Resistors O and P are included in the circuit for the purpose of helping to grade (or distribute in a desired manner) the open circuit voltage across the controllable electronic devices X, A, B, C, etc., so that the most effective use of the controllable electronic switches voltage characteristic can be made. Although not shown, electronic protective circuits such as VBO (voltage break over) or MOV (metal oxide varistors) can be used to protect the system for unusually high transient or dynamic voltages.

It will be understood by those versed in the art that one clear advantage of FIG. 2 over that of FIG. 1 is that the controllable electronic switches in the tap changing winding of FIG. 2 can be of considerably lower current rating. Accordingly, the cost of the tap changing device or system can be reduced considerably. Additionally, group X can replace the system breaker and the reclosing mechanisms for that particular apparatus, since, group X must be rated for full load current and is capable of reacting faster (at least one half-cycle) than any mechanical breaker.

As will be understood from what has been indicated previously, the function of the control device 20' is to provide the gating signals to the controllable electronic devices to accomplish at least three activities: the selection of the appropriate electronic devices to achieve the desired voltage or current level (elements A–L in FIG. 2); to gate or block the breaker (group X in FIG. 2); and to protect the system due to failure of the control itself or some component in the apparatus or system. Current state of the art in gating of controllable electronic devices is sufficient to meet any envisioned control and/or protection strategy.

Figure 3:
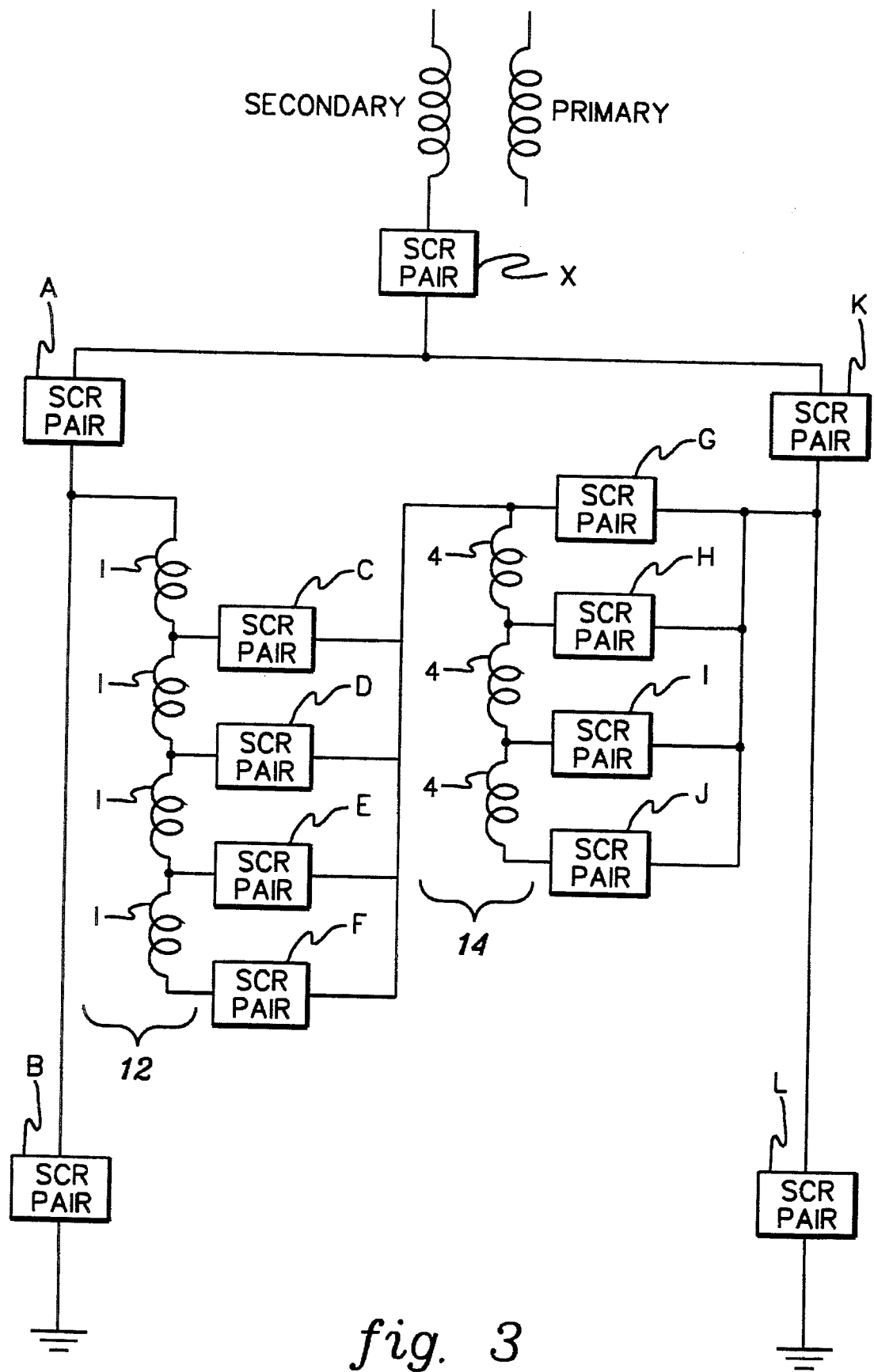
FIG. 3 depicts another configuration in accordance with the present invention, but requiring fewer groups of controllable electronic devices for the number of tap changer steps required.

FIG. 3 illustrates a different winding arrangements from those shown in FIG. 1 and 2. FIG. 3, like FIG. 2, combines a tap changing mechanism with the circuit opening (or breaker) controlled electronic device. This will accomplish the desired task of controlling the flow of short-circuit current and allowing lower rated electronic devices to be reliably used. FIG. 3 also shows a subset of a geometric winding arrangement which requires the minimum number of controllable electronic devices to achieve the desired voltage steps. With this illustrated subset arrangement, there are 2 tap winding groups, the first group 12 being indicated to have sections of one unit each and the other group 14 to the right of the first group, having sections of 4 units each. It is understood that each unit may consist of one or more winding turns based on the turns ratio of the device to which it is applied. Thus, the tap winding group to the right in what may also be termed the second group has a number of turns 4 times greater than the number of turns in each of the sections in the group 12, or first spaced group.

Figure 8A:
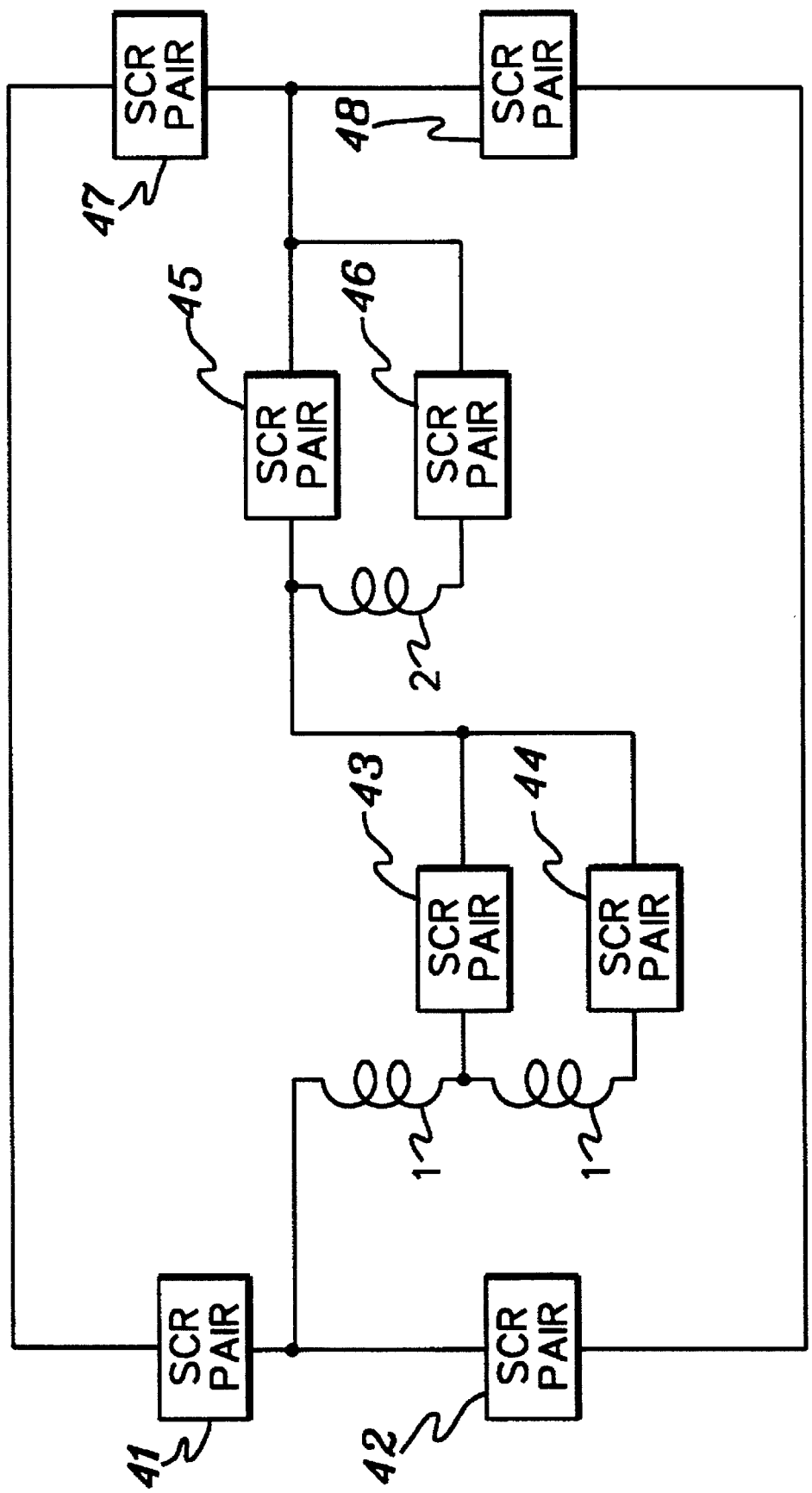
FIG. 8A, 8B, & 8C depict the first three geometric tap winding arrangements taught in accordance with this invention.
Figure 8B:
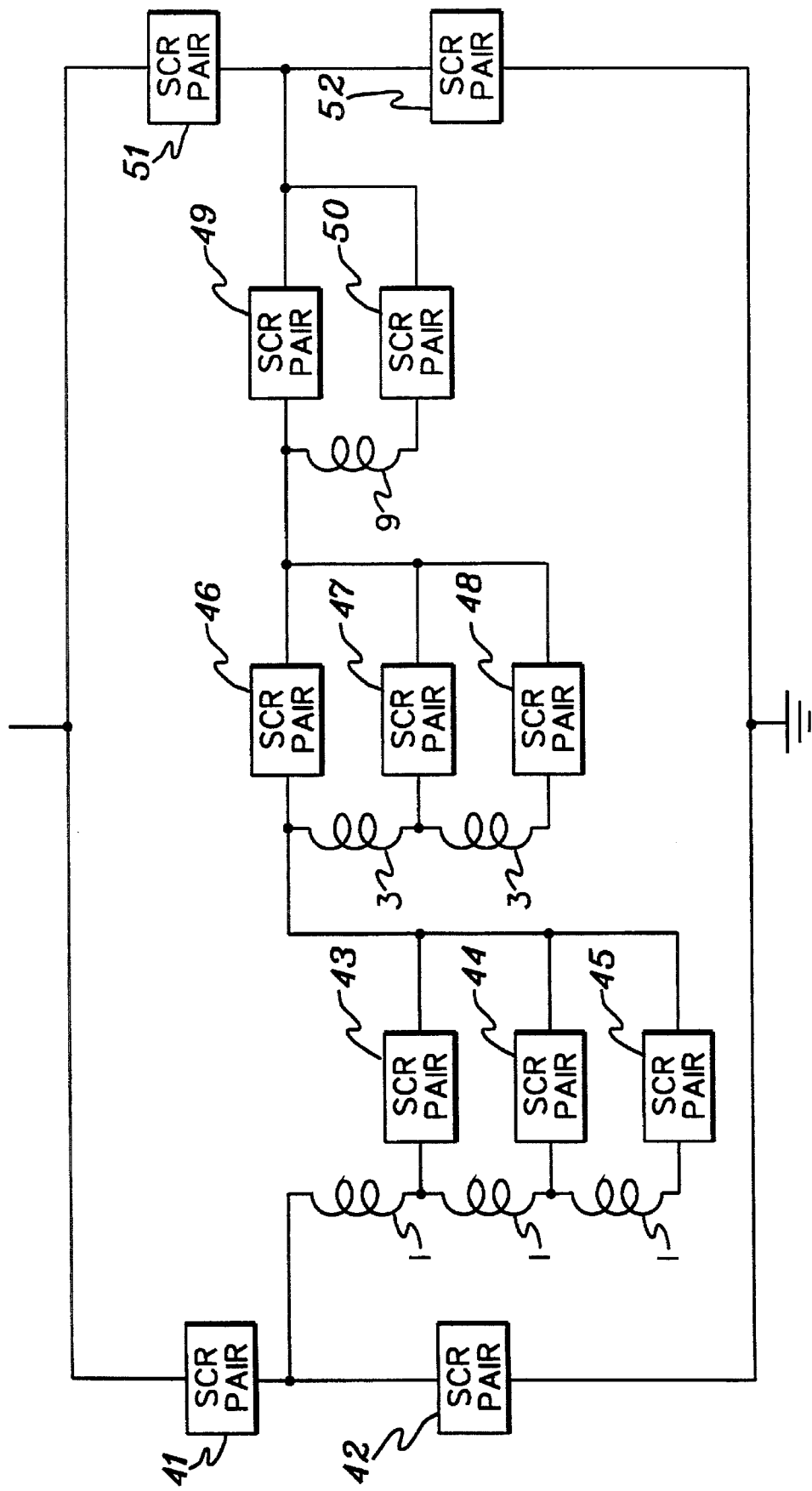
Figure 8C:
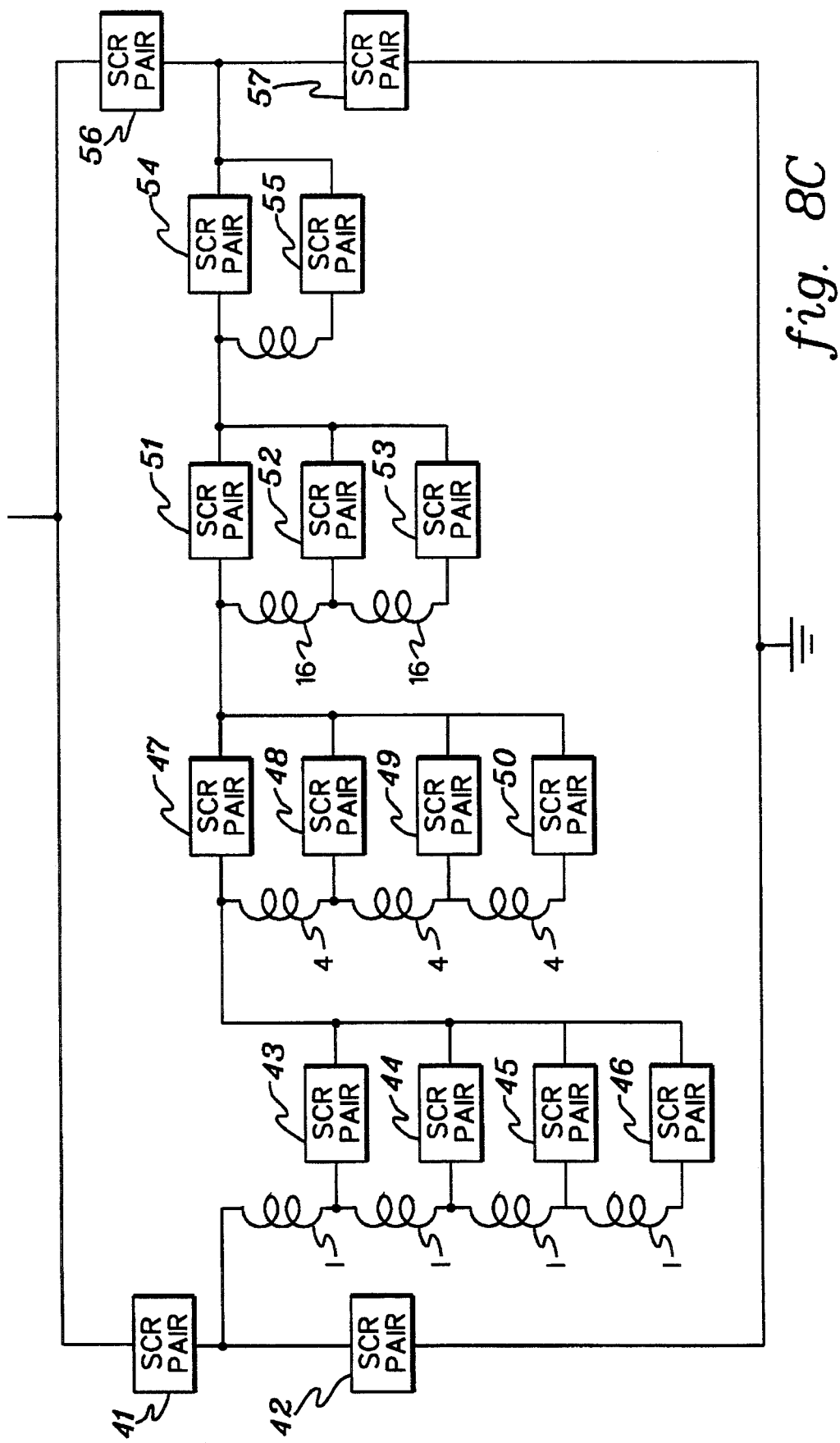

FIG. 8 contains three geometric tap winding arrangements requiring the minimum number of controllable electronic switches for the maximum number of integer tap steps. FIG. 8A contains the simplest arrangement comprised of two one step taps and one two step tap. With 8 thyristors (or controllable electronic switches) this arrangement can achieve up to plus or minus 4 tap steps. FIG. 8B contains the next geometric arrangement which is 3 groups of one step taps, 2 groups of three step taps, and 1 group of nine step taps. As shown with the use of 12 pairs of thyristors this arrangement can achieve up to plus or minus 18 steps. FIG. 8C illustrates a geometric tap arrangement of 4 groups of one step tap, 3 groups of four step taps, 2 groups of 16 step taps, and 1 group of a 48 step tap. With 17 thyristors this arrangement can achieve every integer step from –96 to +96. FIG. 3 contains a tap winding arrangement which consists of the first two tap winding groups of FIG. 8C. The advantage of this type of tap winding arrangement is the simplicity of winding construction and the reduced number of required controllable electronic switches to achieve a desired voltage level (in this example the industry standard of + and –16 steps). Accordingly, this arrangement will produce an electronic tap changing mechanism of reduced cost.

It should be noted in connection with FIG. 3, that the control device previously seen has been eliminated for the purpose of simplification. Also, the non-linear resistors (MOV's) N and M seen in FIG. 2, and voltage grading resistors O and P have been eliminated for clarity in the drawing but may be required in the construction.

In FIG. 3, under the assumption of normal operation, the control device will gate (fire) the appropriate thyristors (or controllable electronic switches) to select the specified tap position. Such normal operation will be referred to as mode 1. It will be seen that for the case of zero added turns to the secondary the current path will involve current flow through either the path containing thyristors X, K, and L in series or X, A, and B in series. As will be apparent such current flow is to reference potential (ground). The other positions, involving, steps 1 through plus 16 or minus 1 through minus 16 involve two possible criss-cross paths in FIG. 3, The flow for negative taps is through K and thence through various selected paths, including any one of C to F and G to J and finally B to ground. The flow for positive tap addition is through A and then any controllable switch C to F and G to J and finally L to ground.

As one example, let us assume that one wants plus 7 winding taps at a given moment, then controllable electronic switches X, A, E, H, and L are selected as those in the group of thyristors that are to be gate on and conducting. The E group is at a location, i.e., the left leg, for which current flow is in the plus direction through three single tap units, and H involves current flow also in the plus direction through four units in the leg on the right. Accordingly, the total added tap winding sections is plus 7.

The person versed in the art will understand the other possible combinations that may be selected (34 possible integer positions being selectable, two of which have the same turns value).

One of the primary concerns in the design of a device which contains controllable electronic switches is that of over-current which can take many forms, i.e., short-circuit or inrush currents. One of the benefits of this invention is that it takes advantage of the short time transient over-current capability of the controllable electronic switches and reconfigures the circuit in a controlled time so that the design of the tap changing mechanism does not have to withstand the anticipated overcurrents in a normal mechanical tap changer or thyristor based tap changer based on previous patents. Therefore, as an example, the tap changer will use the first half-cycle of a fault or abnormal event to identify that an event has occurred and to execute the control strategy to alter the conduction path. One possible embellishment is upon determination of an unacceptably large current to stop gating the breaker controllable electronic device (element X) in FIG. 3. This would not affect the characteristics or performance of the circuit during the first half-cycle of the event but would block element X in the next half-cycle and all subsequent cycles until the control instructs element X to conduct By providing a gating pulse. Thus element X would function both as a high speed circuit breaker and recloser responsive to preset or variable control signals. The above has assumed that element X is composed of all thyristors but it could be constructed from thyristors and gate turn off devices which could force the fault current to zero based on some control strategy. This reaction to an abnormal event is referred to as mode 2. The timing of the control signals to the element X is completely general and is dependent upon economic and user dictated operational preferences. The operation of the tap changer mechanism in each phase can be coordinated or they can be operated independently.

One knows that an abnormal event is occurring by a variety of measurements including, but not limited to, current, voltage, harmonics, etc. The actual measurement or sensing can be accomplished in a variety of ways and the final configuration for a tap changing mechanism is a blend of several factors including but not limited to economics, reliability, and user perference. Referring back to FIG. 2, as indicated previously, the suitably disposed input control line 22 is connected to the control device 20' for this purpose. Alternately, the control could be created to react based on some level of ampere-seconds or ampere-cycles. In either case, the required control signal would be generated to cause the shifting of operation of the tap changer in mode 2. Mode 2 involves in the simplest of its embellishments the "blocking" of breaker group X composed of controllable electronic switches in the tap changer 10' thereby creating the previously noted open circuit between the tap changer T' and the main or secondary winding. If the breaker group X is located at the neutral, at the line terminal, or spread through-out the tap changer, the effect of blocking it is manifest in a different open circuit pattern but one familiar to one skilled in the art.

The process of opening the tap changer windings produces a turns ratio voltage distribution across the thyristor group X between the secondary winding S and the tap changer 10'. The linear distribution within the tap changer is assisted by the grading resistors (see elements P, Q, N, O, R in FIG. 4). Depending on the magnitude of this voltage, the tap changer in FIGS. 3 and 4 may be able to withstand the voltage by itself or will have to be protected with a shunt circuit 30, as seen in FIG. 5. Therefore, if the system requires the use of such shunt protector circuit, the signal for transferring to mode 2 will not only open the circuit to the tap changer winding T', but will fire the thyristor group G in FIG. 5.

A different situation governs at the occurrence of the second half-cycle after short circuit. In the simplest case the transformer secondary is open and the tap changer can withstand the dynamic overvoltage without the use of the shunt circuit just referred to. This is the preferred arrangement because it is the simplest. This configuration will be held until a signal is generated from the utility control system that is acceptable to start conducting again. This signal could be developed from a number of different strategies, not being part of the present invention. It is enough in accordance with the present invention that a signal is received at some point in time.

If the use of the shunt protective circuit 30 seen in FIG. 5 is required, its function will be to divert the short circuit currents of the balance of the winding that is tapped into an energy absorbing resistor (element B). This resistor is sized so that the voltage across it when conducting will be no more than some acceptable multiple times the voltage across the tap range (e.g., if the tap range is 10% and the acceptable multiple were 4, then the current through this resistor should be limited to a value that would give only 40% voltage across resistor B in FIG. 4). This limits the dynamic voltage across the tap changer to 40%. The thyristor group G in the shunt circuit of FIG. 5 will have to be able to carry at least 2.5 times the nominal current in the secondary winding. The balance between voltage across the tap changer and the current through the shunt will be very strongly influenced by economics of the components and labor.

Now let us consider a return to mode 1 conduction. After some period of time, the utility system should have cleared its short circuit. If the arrangement is one in which only the tap changer is used as in FIG. 3 and 4, the system will, upon receipt of the signal, resume gating the thyristors again. In other words, the system will move from mode 2 back to mode 1. The decision to return to mode 1 can be made in number of ways and will be strongly influenced by the utility purchasing the apparatus. The advantage of the system that does not need the shunt protective branch of FIG. 5 is that it has no time limit. Therefore, almost any strategy in the utility group 1 could be used to move from mode 2 to mode 1.

However, any protective relay system designed in accordance with electrical codes standards will clear this type of external fault by opening the upstream circuit breakers before this is a possibility.

It will be appreciated that the zinc oxide non-linear (MOV) devices C and D will protect the circuit under all conditions.

Figure 4:
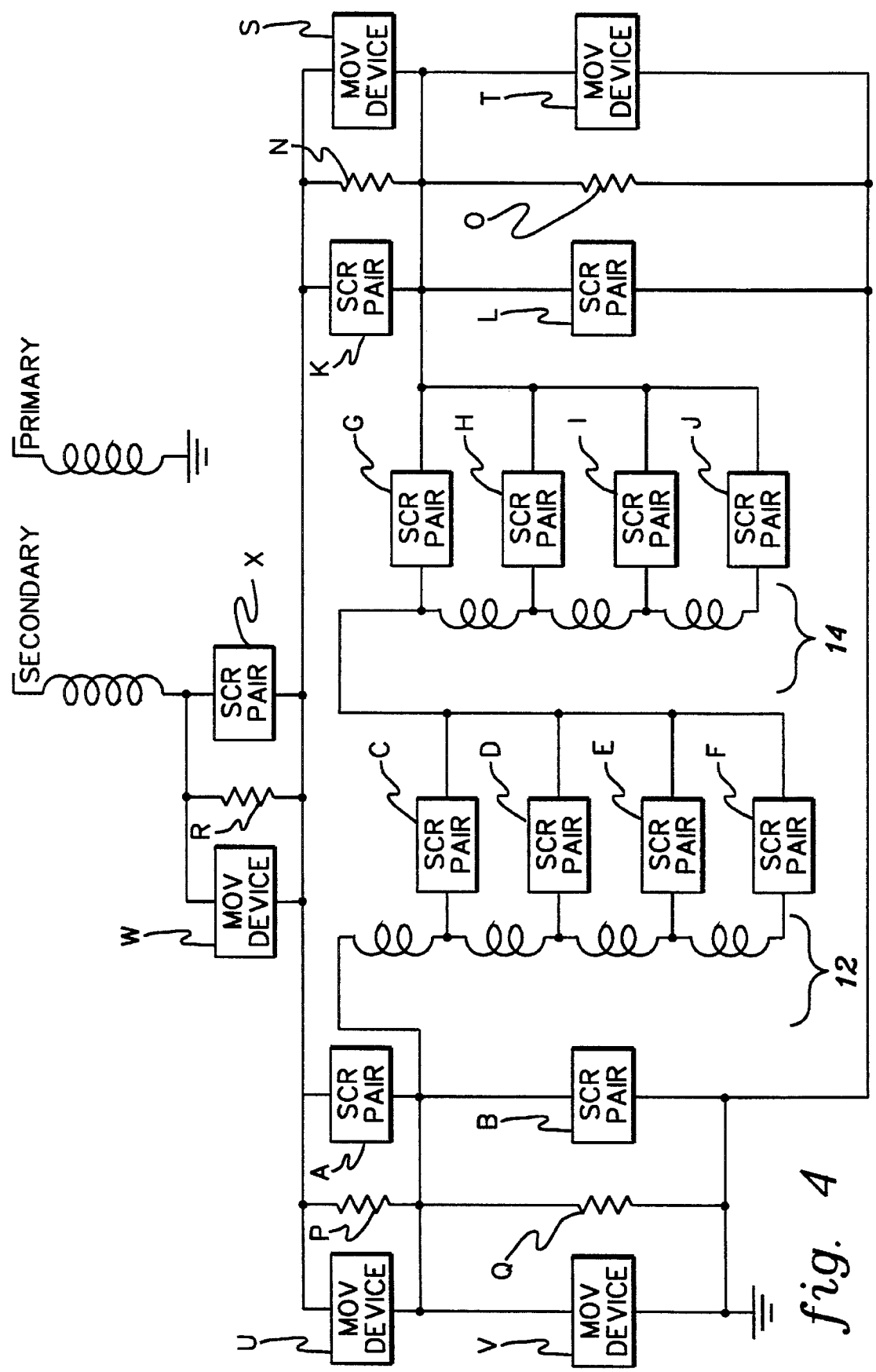
FIG. 4 depicts another version of FIG. 3 with non-linear resistors MOV (metal oxide varistors) used to protect the system during transient over voltage and grading resistors to help distribute the open circuit voltage in a desired manner.
Figure 5:
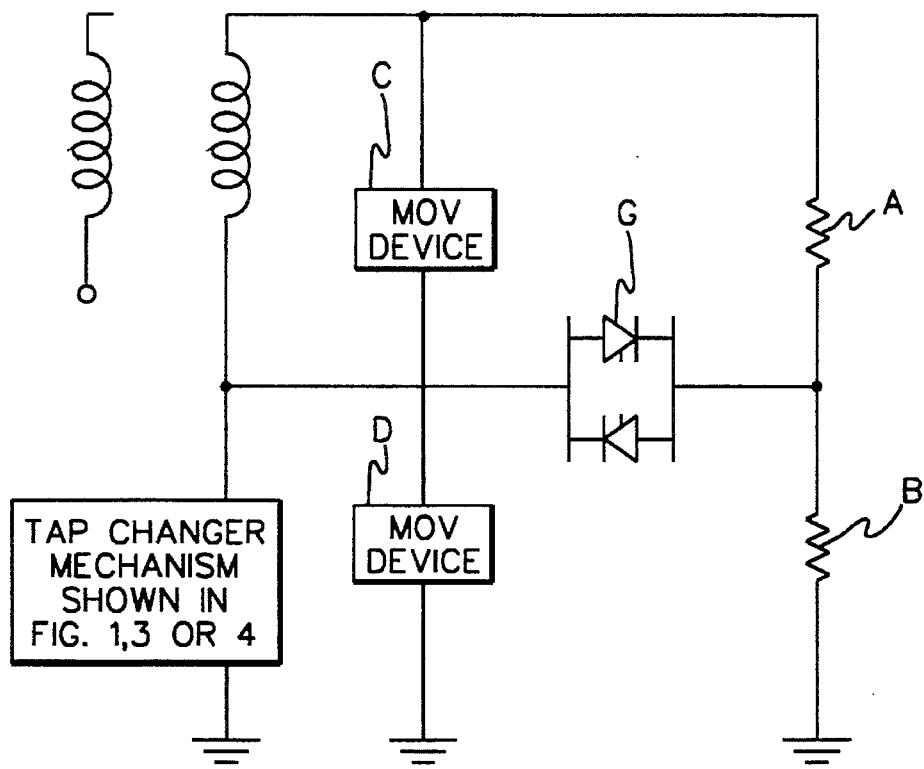
FIG. 5 depicts a possible arrangement for voltage grading during the period after the tap changer mechanism has been open circuited.
Figure 6:
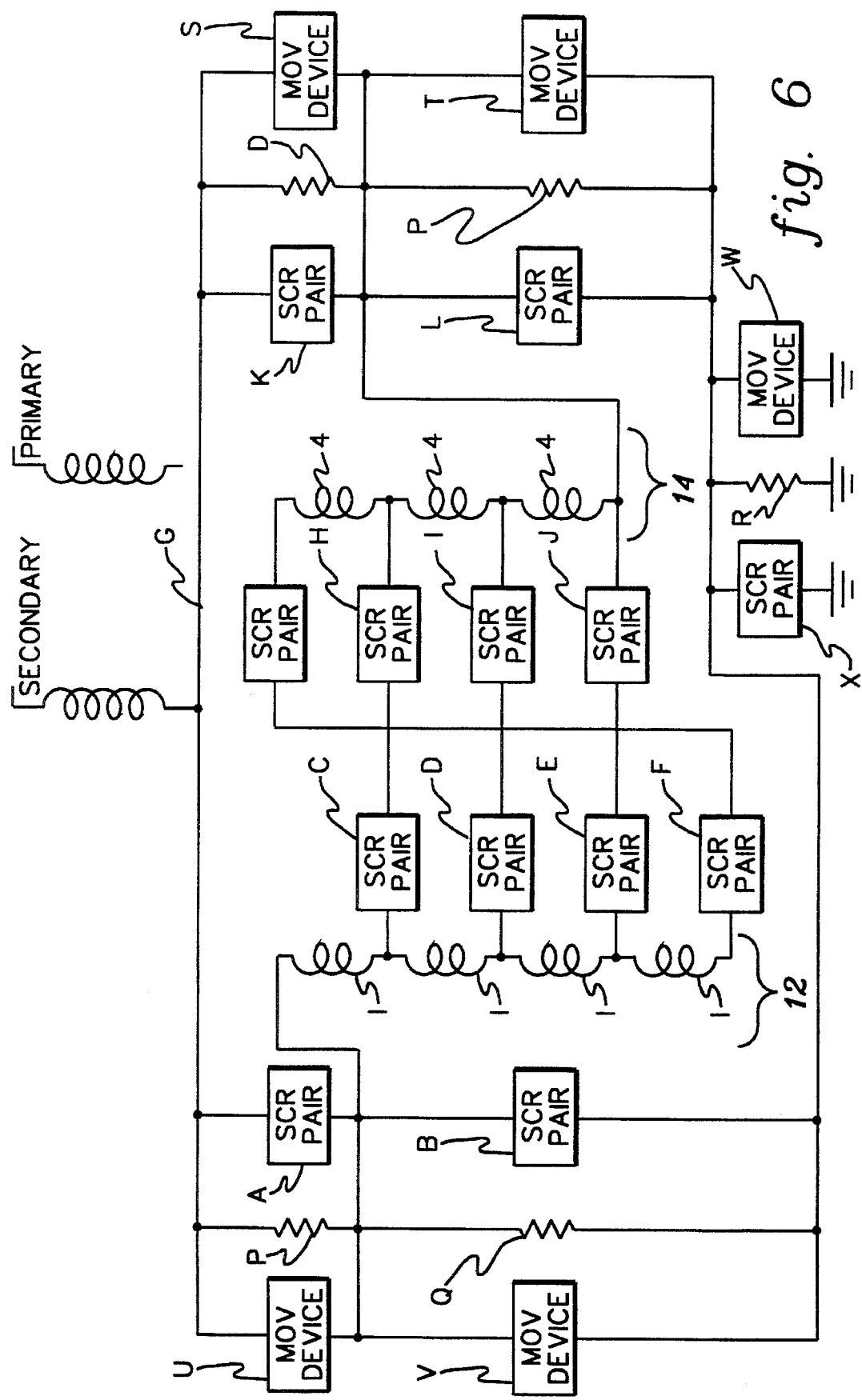
FIG. 6 depicts one of the several possible variations of the configuration illustrated in FIG. 3.

FIG. 6 is an alternative to the arrangement shown in FIGS. 3 and 4. In FIGS. 3 and 4, when the breaker thyristors X were gate off, the control or gating signal to all the other groups of thyristors could also be gate off. In the configuration shown in FIG. 6, when the breaker thyristors X are gate off the remaining thyristors in the tap changer must maintain the prefault position gating pattern. This will insure that the total open circuit voltage will appear across the breaker thyristor group X.

Figure 7:
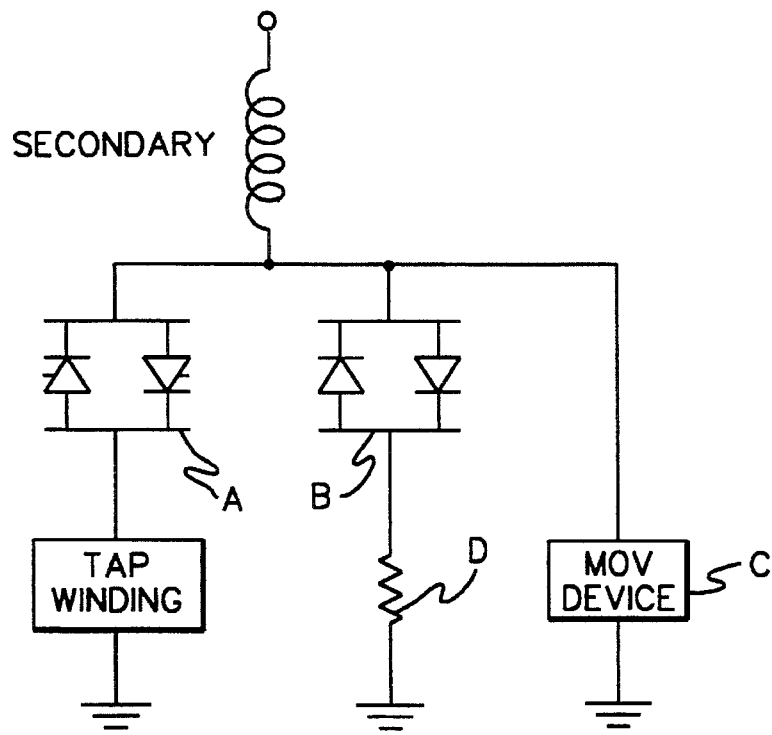
FIG. 7 depicts a possible arrangement to shunt the short circuit current through a load.

Referring now to FIG. 7, the principle of the present invention is here modified to limit short-circuit current or inrush current to an acceptable level. Under normal operation, switch A is closed (gate to conduct) and switch B is open. During inrush or short circuit, switch A is gate off and switch B is gate on. This forces the event current through resistor D and as such will limit the current during the fault, Voltage across the neutral is limited by the non-linear resistor C. The tap winding shown is similar to that shown in FIG. 3 or 4.

Although a number of embodiments of the present invention have been shown herewith, it will be apparent to those skilled in the art that other variations or modifications of the fundamental principle can be made. For example, the control scheme of the tap changer could also briefly make use of the firing angle capability of thyristors so as to limit the magnitude of the inrush or short circuit current. Also, instead of thyristors, GTO devices could be substituted if a performance advantage would be economically attractive.

It will be understood that, in addition to those specifically discussed, a large number of other geometric winding progressions can be provided. Also, the principle of the present invention can be applied to both the primary and the secondary windings of a given transformer, the advantage being that a very great number of tap-changing steps are then achievable.

It should also be borne in mind that asynchronous gating can be alternately employed; that is, instead of the syncronous gating already discussed. In FIG. 3, it has been demonstrated that it is possible to achieve +2 tap steps by continuously gating the thyristor pairs A, D, G, L, and X. It is also possible to achieve +3 tap steps by continuously gating thyristor pairs A, E, G, L and X. In like manner +4 tap steps can be achieved by gating A, F, G, L, and X. It is also possible to achieve the +3 tap steps RMS voltage by alternately gating the +2 and +4 tap steps. The advantage of this latter scheme is that any voltage can be achieved by the selection of the number and combination of tap steps gated. As an example, +2.5 tap steps could be achieved by repeating the combination of 3 times gating the +2 tap step in combination with 1 time gating of the +4 tap step. This will allow the use of fewer thyristors or thyristor groups to achieve the standard +/−16 steps or alternately the ability to make the apparent tap steps much finer. This gating can be performed at each half cycle, i.e., 3 half cycles of +2 the 1 half cycle of 3 repeated 30 times a second equals +2.5 voltage steps. Alternately, the thyristors can be gated individually on alternate half cycles, i.e., +2, +1, +2, +1, . . . =+1.5 tap and +3, +2, +3, +2 . . . =+2.5 tap. This operation will generate some level of harmonic output, but this can be controlled and minimized by using a random gating arrangement around the desired voltage tap position. Alternately, this harmonic output can be orchestrated to reduce the harmonic content of the utility system in general. This can be accomplished by an active control that adjusts the gating signals to the thyristors as a function of the harmonics that exist in the system.

It will be apparent that the general principle explained above for minimizing the number of physical winding tap steps, yet having a wide variety of intermediate steps, relies on selective gating on a sequential basis of a combination of switches to fixed selected tap steps so that intermediate values therebetween may be obtained. As an example, it has been specifically noted above that tap +3 steps (providing a desired output voltage) may be obtained simply by alternating gating +2 and +4 tap steps, However, even finer refinements can be obtained and such are, indeed, obtained by the extension of that principle following a concept of the present CIP application, namely, the discrete-cycle modulation concept, Such concept enables very small percentage differences between physical voltage steps by precisely controlling the number of cycles during which one set or combination of switches is activated and then another combination of switches is activated for additional cycles, and repeating these gating sequences as long as the resulting RMS voltage is required.

Figure 9:
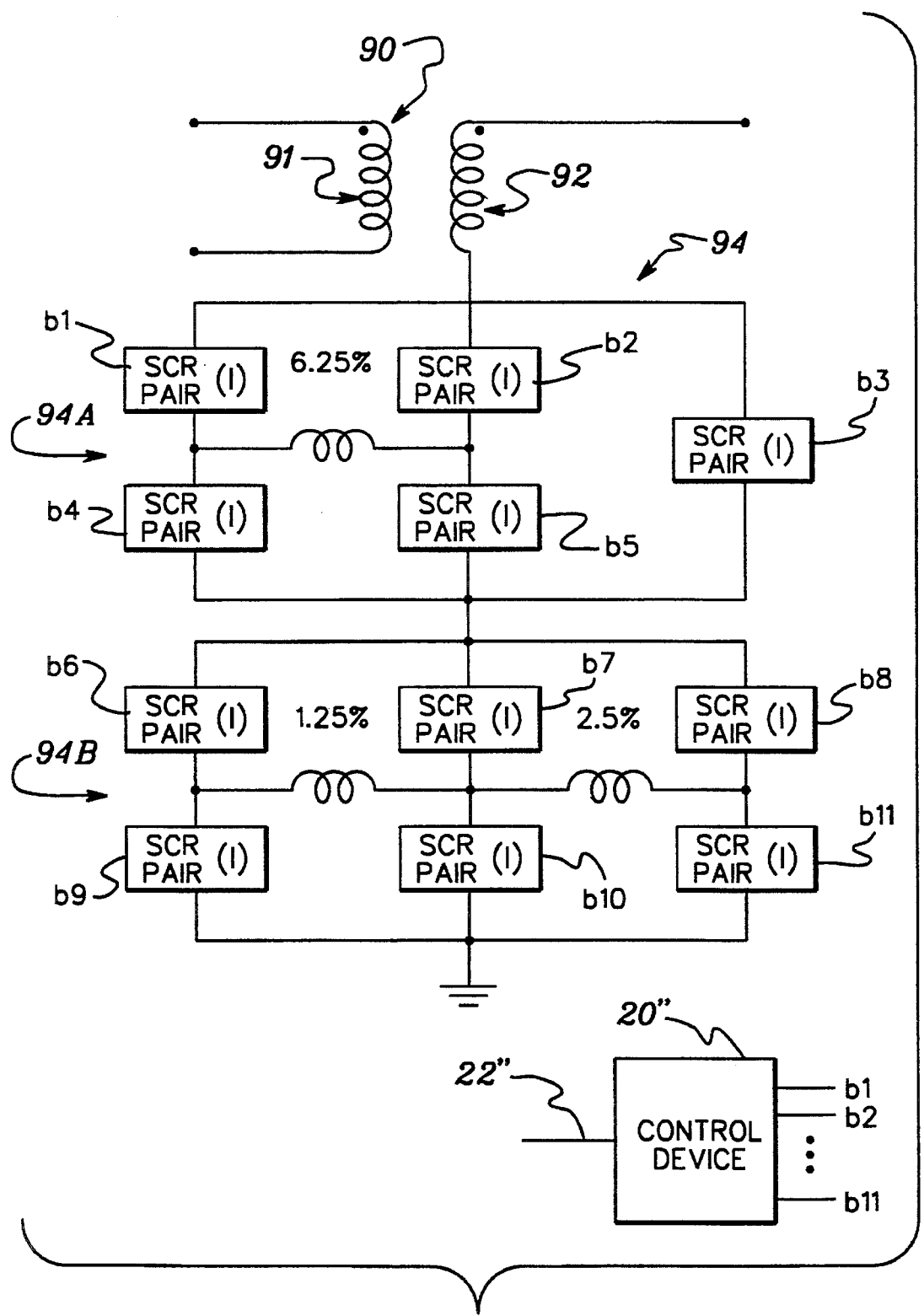
FIG. 9 is a schematic diagram of a single phase circuit topology involving a plus or minus 10% load tap changer, having a minimum of 32 incremental tap voltage steps, three physical tap windings being located with the transformer winding, on a 34.5 KV 30 MVA system using 4500 volt SCRs; further including a control device shown in simplified form for controlling transmission of switching signals to the gates of the individual switches.

Referring now to FIG. 9, a single phase topology is seen in which plus or minus 10% load tap changing is achieved on 34.5 KV 30 MVA system using 53 MM, 4500 V SCRs. At the top of this figure is an inductive device, typically a transformer 90 having a primary winding 91 and a secondary winding 92. Included in FIG. 9 is a tap changer scheme or means 94 comprising two tap changer units 94A and 94B connected in series, the upper unit 94A being a basic unit controlling one tap winding (6.25%) with four associated switches b1, b2, M and b5. The other unit 94B controls two tap windings (1.25% and 2.5%) with six associated switches n6–b11. Numbers inside each of the individual boxes representing switches show how many back-to-back SCRs are connected in series in each switch. The switch b3 is added to the first tap changer unit 94A because it is desirable that three paths be available for sequentially sharing excessive currents. However, since the second tap changer unit 94B is already constructed to have three shunt paths, no more need be added. The sequential sharing of excessive or fault currents in this way permits the maximum use of each SCR without violating its thermal rating. That is, each path must support the full over current during, at most, every third cycle.

Figure 10A:
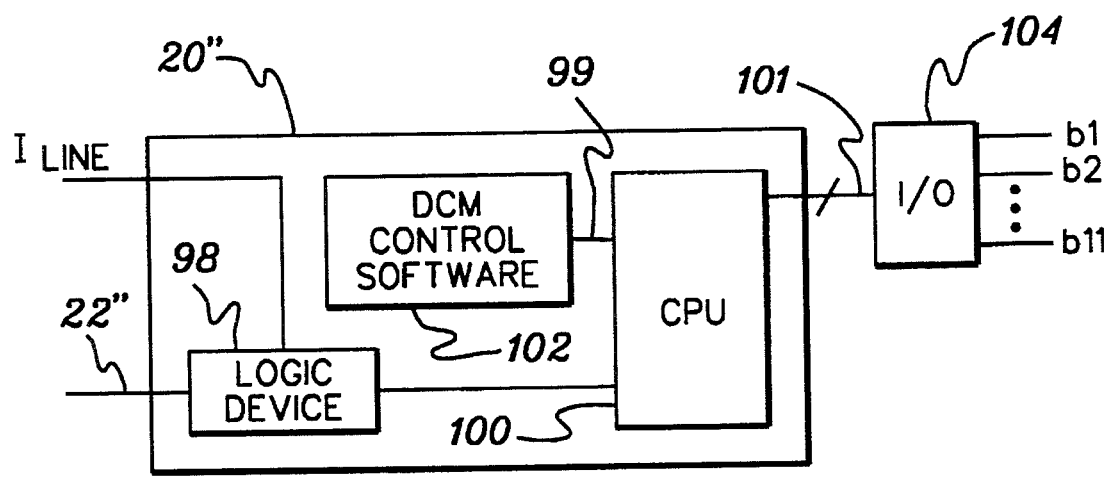
FIG. 10A is a block diagram of a first embodiment showing the components inside the control device 20", such components being arranged to provide gate signals for purposes to be described.

As noted in the brief description of the drawing, FIG. 10A essentially depicts the various components within the control device 20". This scheme provides for synchronous operation based on the fact that Iline is fed to a logic device 98 to which line 22" is also connected such that gating signals will be initiated at zero current crossings.

Figure 12:
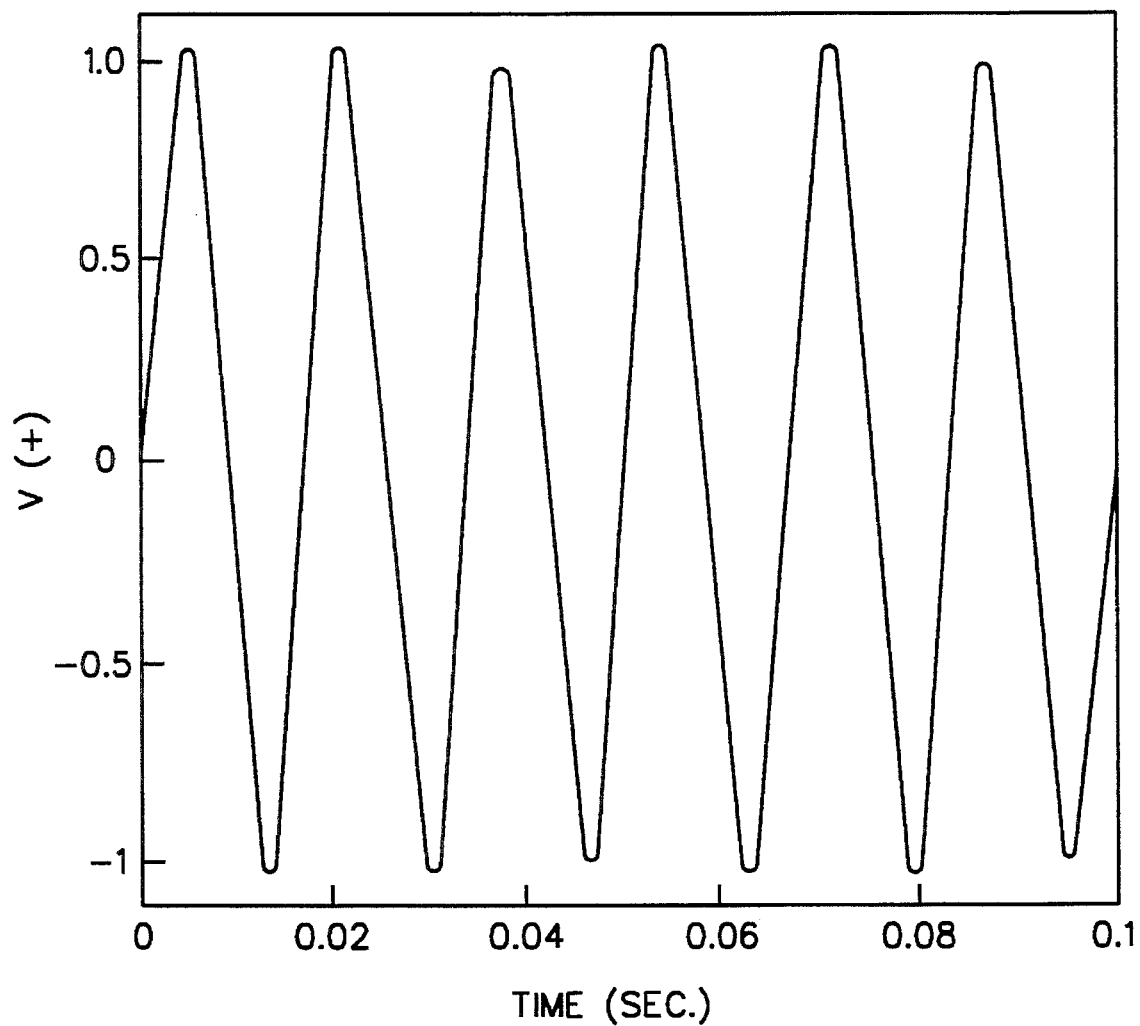
FIG. 12 is a graph of the output voltage vs. time.

A control voltage is fed on a line 22", from a source, such as a power control system, or from an error voltage source in accordance with that source's variation from a reference value. The control voltage can be either analog or digital and, if analog, is translated in device 98 into an appropriate digital signal which is then fed to CPU 100. CPU 100 is controlled by appropriate control software 102, based on the discrete-cycle modulation concept of the present invention, to cause selective signals to be fed to the I/O interfaces 104. From interface 104, an appropriately timed combination of switching signals is fed to the individual gates of switches b1–b11, seen in FIG. 9, to produce selective conduction of combinations of those switches—as will be apparent from Table I so as to synthesize an RMS output voltage from discrete-cycles having different voltage magnitudes. Such a resultant output voltage over a time span of 0.1 seconds is seen in FIG. 12 for a purely resistive load. The RMS output voltage is controlled through changes in Vo, V1, M & N where Vo is choice of lower tap voltage, V1 is choice of higher tap voltage, M is number of cycles at higher voltage, and N is number of cycles in a modulation packet.

It will be appreciated that the discrete number of cycles is formulated in such a modulation packet comprising either two or three cycles (in the simplified versions). Reference here to the Table I (see page 22) of the specification indicates in Column 1 the various cases being considered involving a particular combination of switches being switched on for a given time, and Columns 2 and 3 (N and M) identify the cycles involved in a given modulation packet, where N represents total cycles, M represents the number of cycles when the higher magnitude of voltage is being switched (V1), and N minus M (N–M) represents the number of cycles when the lower magnitude of voltage Vo is being switched.

Such a discrete-cycle modulated wave form can be appreciated from FIG. 12, in which M represents the number of cycles (e.g. 2) at higher voltage, (e.g. 1.0875), N is the number of cycles in a modulation packet (e.g. 3), and N–M is the number of cycles at the lower voltage (e.g. 1.0250). Of course, from the table herewith presented as Table I (see page 22), it will be seen that M and N can take on other values such as N being 2 cycles, or M being 1 cycle. It is possible to pair up valid modulation packets of different M and N within the ordinary flicker constraint, while creating an effective voltage which is different from what either modulation packet would produce on its own. This multiple modulation is referred to as super modulation, which is important since it allows one to generate a large number of additional effective tap voltage increments between each of those listed in Table I. This is done by applying the modulation principle to those 24 synthesized voltage steps shown in Table I as though they were actual physical taps. For example, one could modulate i=1 and i=2 using combinations of M and N to achieve tap voltage increments between 0.417% and 0.625% (listed in Table I, Column 15, rows 2 and 3).

TABLE I

| 1 | 2 | 3 | 4 | 5 | 6 | 7 | 8 | 9 | 10 | 11 | 12 | 13 | 14 | 15 | 16 | 17 |
|---|---|---|---|---|---|---|---|---|----|----|----|----|----|----|----|----|
|   |   |   | Block Numbers | | | | | | | | | | | O.T.V. | | Max. magnitude |
| j | N(i) | M(i) | 1 | 2 | 3 | 4 | 5 | 6 | 7 | 8 | 9 | 10 | 11 | $T_j^m$ | Flicker | of harmonies |
| A |   |   | ● |   | ● |   | ● |   |   | ● |   |   |   | 0% | None | None |
| 1 | 3 | 1 | ● |   | ● |   | ● |   |   | ⊞ | * |   |   | 0.417% | <10% | 0.004134 @ 40 Hz |
| 2 | 2 | 1 | ● |   | ● |   | ● |   |   | ⊞ | * |   |   | 0.625% | <5% | 0.005305 @ 30 Hz |
| 3 | 3 | 2 | ● |   | ● |   | ● |   |   | ⊞ | * |   |   | 0.833% | <10% | 0.004134 @ 40 Hz |
| B |   |   | ● |   | ● |   | ● |   |   | ● |   |   |   | 1.250% | None | None |
| 4 | 3 | 1 | ● |   | ● |   | ● |   | ⊞ | * | ⊞ |   |   | 1.667% | <10% | 0.004134 @ 40 Hz |
| 5 | 2 | 1 | ● |   | ● |   | ● |   | ⊞ | * | ⊞ |   |   | 1.875% | <5% | 0.005305 @ 30 Hz |
| 6 | 3 | 2 | ● |   | ● |   | ● |   | ⊞ | * | ⊞ |   |   | 2.083% | <10% | 0.004134 @ 40 Hz |
| C |   |   | ● |   | ● |   | ● |   | ● |   |   | ● |   | 2.5% | None | None |
| 7 | 3 | 1 | ● |   | ● |   | ● |   | ● | ⊞ | * |   |   | 2.917% | <10% | 0.004134 @ 40 Hz |
| 8 | 2 | 1 | ● |   | ● |   | ● |   | ● | ⊞ | * |   |   | 3.125% | <5% | 0.005305 @ 30 Hz |
| 9 | 3 | 2 | ● |   | ● |   | ● |   | ● | ⊞ | * |   |   | 3.333% | <10% | 0.004134 @ 40 Hz |
| D |   |   | ● |   | ● |   | ● |   | ● |   | ● |   |   | 3.750% | None | None |
| 10 | 3 | 1 | ● |   | ⊞ | * | ⊞ |   | * | * | ⊞ |   |   | 4.167% | <10% | 0.004134 @ 40 Hz |
| 11 | 2 | 1 | ● |   | ⊞ | * | ⊞ |   | * | * | ⊞ |   |   | 4.375% | <5% | 0.005305 @ 30 Hz |
| 12 | 3 | 2 | ● |   | ⊞ | * | ⊞ |   | * | * | ⊞ |   |   | 4.538% | <10% | 0.004134 @ 40 Hz |
| E |   |   | ● | ● | ● |   |   |   |   |   | ● |   |   | 5.0% | None | None |
| 13 | 3 | 1 | ● | ● |   |   | * | ⊞ |   |   | ● |   |   | 5.417% | <10% | 0.004134 @ 40 Hz |
| 14 | 2 | 1 | ● | ● |   |   | * | ⊞ |   |   | ● |   |   | 5.625% | <5% | 0.005305 @ 30 Hz |
| 15 | 3 | 2 | ● | ● |   |   | * | ⊞ |   |   | ● |   |   | 5.833% | <10% | 0.004134 @ 40 Hz |
| F |   |   | ● | ● |   |   | ● |   |   |   | ● |   |   | 6.250% | None | None |

TABLE I-continued

| 1 | 2 | 3 | 4 | 5 | 6 | 7 | 8 | 9 | 10 | 11 | 12 | 13 | 14 | 15 | 16 | 17 |
|---|---|---|---|---|---|---|---|---|----|----|----|----|----|----|----|----|
|   |   |   | Block Numbers | | | | | | | | | | | O.T.V. | | Max. magnitude |
| j | N(i) | M(i) | 1 | 2 | 3 | 4 | 5 | 6 | 7 | 8 | 9 | 10 | 11 | $T_j^m$ | Flicker | of harmonies |
| 16 | 3 | 1 | ● | ● |   |   | ● |   |   |   | ▦ | * |   | 6.667% | <10% | 0.004134 @ 40 Hz |
| 17 | 2 | 1 | ● | ● |   |   | ● |   |   |   | ▦ | * |   | 6.875% | <5% | 0.005305 @ 30 Hz |
| 18 | 3 | 2 | ● | ● |   |   | ● |   |   |   | ▦ | * |   | 7.083% | <10% | 0.004134 @ 40 Hz |
| G |   |   |   | ● | ● |   |   | ● |   |   | ● |   |   | 7.5% | None | None |
| 19 | 3 | 1 | ● | ● |   |   |   |   | * | ▦ | * | ▦ |   | 7.917% | <10% | 0.004134 @ 40 Hz |
| 20 | 2 | 1 | ● | ● |   |   |   |   | * | ▦ | * | ▦ |   | 8.125% | <5% | 0.005305 @ 30 Hz |
| 21 | 3 | 2 | ● | ● |   |   |   |   | * | ▦ | * | ▦ |   | 8.333% | <10% | 0.004134 @ 40 Hz |
| H |   |   | ● | ● |   |   |   |   |   | ● |   | ● |   | 8.750% | None | None |
| 22 | 3 | 1 | ● | ● |   |   |   |   |   | ● | ▦ | * |   | 9.167% | <10% | 0.004134 @ 40 Hz |
| 23 | 2 | 1 | ● | ● |   |   |   |   |   | ● | ▦ | * |   | 9.375% | <5% | 0.005305 @ 30 Hz |
| 24 | 3 | 2 | ● | ● |   |   |   |   |   | ● | ▦ | * |   | 9.583% | <10% | 0.004134 @ 40 Hz |
| I |   |   | ● | ● |   |   |   |   |   | ● | ● |   |   | 10.0% | None | None |

▦ Switch is on for M cycle
* Switch is on for N–M cycle
● Switch is on for all the time It will be understood that Table I represents only net positive tap voltage increments. By gating the individual switches so as to reverse the relative winding polarities and using the same modulation packets, each of the 24 synthesized output tap voltages and the 8 directly obtainable tap voltages (B, C, D, E, F, G, H, I) can be generated as negative percents of the secondary voltage.

It will also be apparent that similar strategies can be invoked with different percent voltage physical taps, or more or less physical tap windings to create optimized combinations of transformer windings and load tap changer controls strategies for specific power system applications. Thus the windings and controls strategies already shown and described are merely practical examples of the invention.

Figure 13:
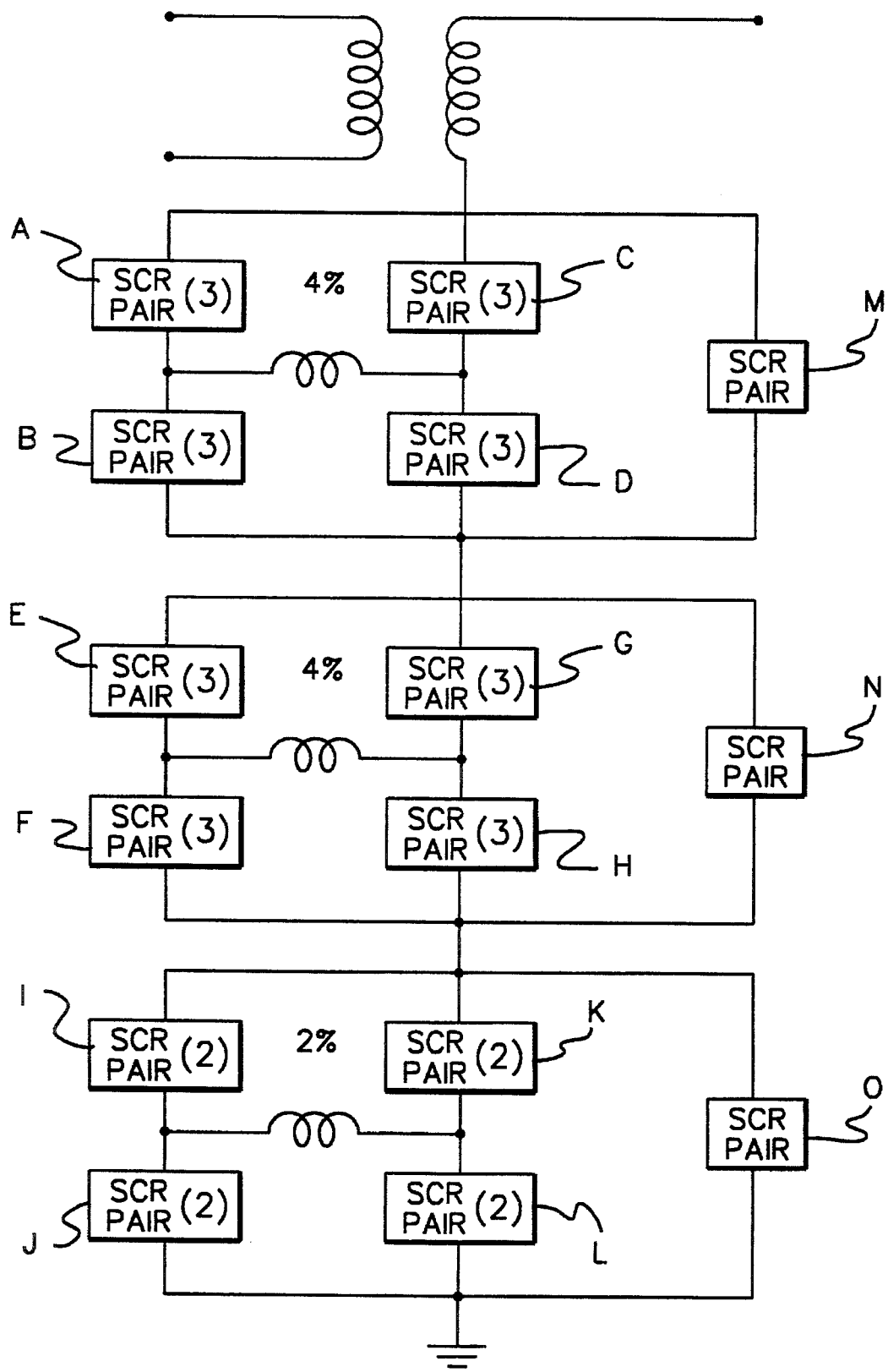
FIG. 13 is a schematic diagram of an alternate embodiment of a single phase circuit topology, as in FIG. 9, having a plus or minus 10% load tap changer; but applied on a 115 KV, 100 MVA system using 4500 V SCRs.

Referring now to FIG. 13, a different example of the application of this invention to another power system and involving different value tap windings are illustrated. Whereas, in FIG. 9 two basic tap units were placed in parallel to form unit 94B and this combination was placed in series with the third basic unit 94A, the configuration in FIG. 13 is such that 3 basic units are connected in series. Again, numbers inside the boxes representing the switches are the back-to-back SCRs or the like in series for each switch. The system is 115 KV, 100 MVA, using 4500 V SCRs. The switches seen on the far right in FIG. 13 are placed in parallel with each basic tap unit so as to create a third path through which fault current may be circulated. The circulation of fault currents permits the maximum use of each SCR without violating its thermal rating. That is, each path must support the full load current during, at most, every third cycle. The third switch can also be used to improve efficiency when the associated tap winding is not used.

Table I also presents two potential limits for DCM based on the visual perception of flicker. (Column 16), and an acceptable level of harmonics (Column 17). The flicker constraint is arbitrary and is based on a reference study. "The visual perception and tolerance of flicker", by S. R. Griecom, Utilities Coordinated Research, Inc., 1937. This reference suggests a relationship between the magnitude and frequency of a cyclical voltage change and the percent of observers that will perceive flicker in an incandescent lamp. The gating sequences shown in Table I will limit perception of flicker to 10% or less of the observers based on the reference study. The actual flicker perception will vary from application to application of the tap changer system and will control the number of voltage increments that can be synthesized from a given set of tap windings.

The magnitude of harmonics generated in synthesizing the voltage increments, 1 thru 24 in Column 1 of Table I is presented in Column 17 as per unit of the fundamental power frequency. They are significantly less than the levels allowed in Industry Standard, ANSI and are presented for reference.

The gating signals required to produce a particular voltage increment can be directed to the required, inversely connected, pairs of SCR's precisely at zero crossing of the line current, as in discrete-cycle modulation or to the individual SCR, in each of the pairs, that will be required to conduct in the next half cycle of current at any time in the half cycle immediately prior to the required conduction period as in asynchronous gating. In either case the control logic, imbedded in the control software 102, will assure synchronizations with line current and provide the required gating signals to provide a single conducting path thru the tap changer system in each half cycle of line current.

By referring back to FIG. 9, accompanied by Table I, several examples or cases of DCM operation will be explained. For simple cases, zero percent, 5%, 7.5%, and 10%, what is involved are physical tap windings increments.

In contrast to the above, let us consider the examples 7 and 9 shown in the first Column designated i on the Table I. Here, three cycles are involved in the switching operation (N=3). As noted previously—and seen in Table I—the darkened circle symbol stands for the given switch being on all the time. Accordingly, switches 2, 5 and 8 are on for the full three cycles, whereas as seen in Column 3, the M value is 1 and hence, the value N minus M is 2, which means that the switch in the form of a square with dots inside, namely, number 9 is switched on for only one of said cycles at V1 or +3.75%, whereas a switch, namely, number 10 designated with an asterisk (*) and indicating the switch is on for two cycles will result in at Vo or +2.5% an output tap voltage (OTV in Column 15), i.e., an effective output tap voltage of +2.917%, 102.917% of the nominal voltage which, of course, is the weighted average produced by the modulation, that is, by the different number of cycles that given switches are on.

Referring to case number 9 in Table I, this case is very similar to case 7 except that the two switches 9 and 10 are on for different cycles since N retains the value of 3, that is, three cycles but M has a value of 2, and hence, switch 10 is on for only one cycle at the lower magnitude voltage Vo or 2.50% as may be verified by reference to FIG. 9. On the other hand, switch 9 in this case is on for M cycles, i.e., 2 at the higher voltage, V1 or +3.75%.

Accordingly, it will be understood that in cases 7 and 9 the operation is identical except for the two switches 9 and 10 which transmit a different number of cycles during the time when each of 9 or 10 is conductive. Moreover, in case 9, in particular, the effective output tap voltage 3.333 will be readily understood from the fact that where switches b9 and b10 are conductive for the given number of cycles, an incremental tap voltage of 3.75% has persisted for 2 cycles, whereas a 2.50% voltage increment (switches b8 and b10 conductive) has persisted for one cycle. The sum is a 10% voltage increment over the total number of cycles for the modulation packet and the average is 3.333%.

Moreover, it will be seen from Table I that in addition to the various combinations of the physical tap windings, gated on continuously, additional voltage steps are available intermediate to the physical tap voltage values. Combinations of the physical tap voltages A thru I in Column I, additional incremental tap voltage steps are available intermediate to A thru I, namely, 1 thru 24 in Column 1. In this example, the three physical taps generate +/−32 tap voltage increments without super modulation.

Figure 11:
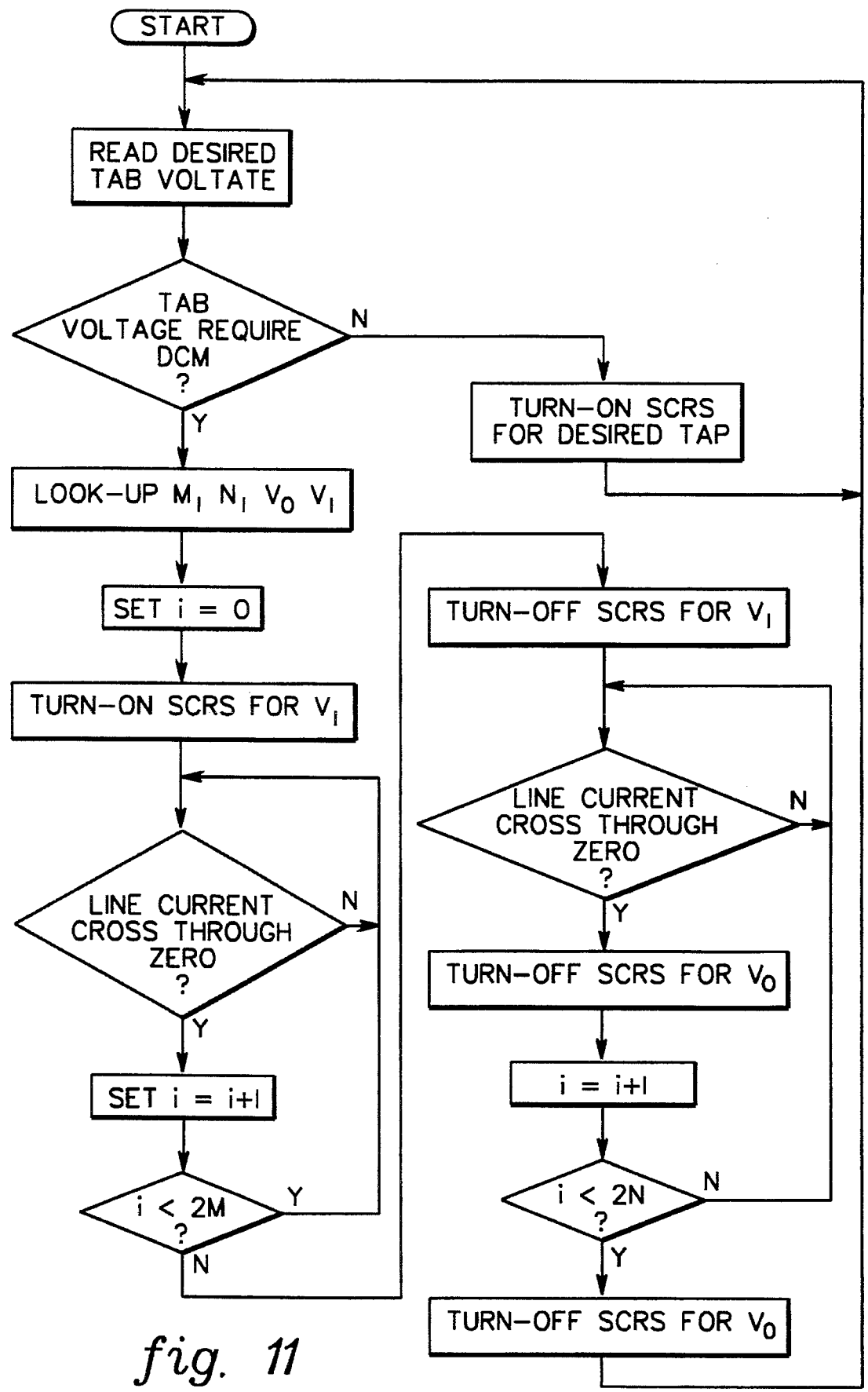
FIG. 11 is a flow chart of DCM control software operative in accordance with the present invention.

By reference to FIG. 11 it will be appreciated that the software scheme operates to achieve what has been already explained; that is, all the appropriate switches are turned on at appropriate times to produce all of the desired intermediate incremental voltage values. By means of appropriate reference to look-up tables and by synchronizing with the zero crossing of line current, the precise required timing of the gating of appropriate switches to produce such intermediate values is enabled.

1. Full Cycle DCM

From what has already been described it will be appreciated that FIG. 11 shows the essential features of the first preferred, full cycle, discrete-cycle modulation (DCM) embodiment of implementation, in the form of a flow chart. To begin, a commanded output voltage is compared against a table of tap values which are physical and against a table of synthetically created tap values to determine whether DCM is needed. The physical tap values are based on the appropriate combination of the actual secondary taps; the synthesized taps are created through proper cyclic alternation between two, or more, physical taps. Gating signals are provided to the appropriate reverse-connected pairs of switches in each of switch means b1–b11. As will be understood, if DCM is needed, a table look up is used to rind M, N Vo, and V1. The switches appropriate to voltage V1 are then closed for M cycles (2M zero crossings), followed by closing the switches appropriate to voltage Vo for N–M cycles (2N–M) zero crossings). This operation is repeated until a different tap value is requested.

2. Half Cycle DCM

Figure 10B:
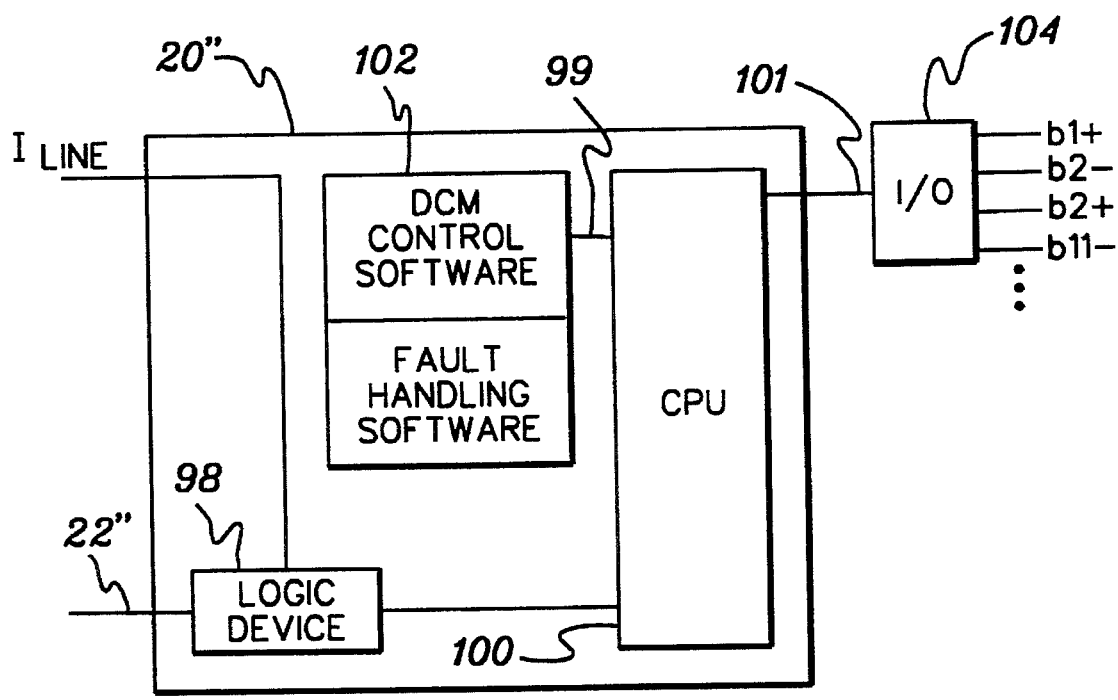
FIG. 10B is another block diagram of a second embodiment, which is similar to FIG. 10A.

In similar fashion to the schematic arrangement of FIG. 10A for the first preferred embodiment, FIG. 10B depicts a second preferred embodiment which is an asymmetric or half-cycle arrangement. In this embodiment, a variation of DCM is effectuated whereby two different voltages are used to create both V1 and Vo. That is, each positive half-cycle of line current is driven by voltage V1, while each negative half-cycle of line current is, driven by V1−.

Similarly, voltage Vo would be decomposed into Vo+ and Vo− for positive and negative half-cycles of line current, respectively. It follows that this method of asymmetric DCM would use M+, M−, N+ and N− to stipulate the number of half-cycles of line current which are driven by V1+, V1−, Vo+ and Vo−, respectively. Thus gating signals b1+, b1−, b2+, b2−, etc. are provided to the appropriate individual switches, which may or may not be in a paired relationship for any given voltage increment. Implementation of asymmetric DCM requires not only information about the zero crossings of the line current, but the derivative of the line current, so that it is known whether each zero crossing of line current is going more positive or going more negative. Practical current sensors facilitate this information when sampled regularly by a digital processor, a comparable digital circuit, or an analog circuit. The determination of line current derivative is readily accomplished by one skilled in the art.

3. Fault Rotation

It will be understood that the fault handling software, seen in FIG. 10B, can also be included in the full cycle DCNI arrangement of the current sensors used for detecting zero-crossings of the line current (and the line-current derivative, as appropriate) call also be used to determine when the line current has increased beyond an acceptable value, referred to here as a fault condition. A dedicated current sensor could also detect a fault. A fault condition would interrupt normal operation of the tap changer, whether DCM is being used or not. The presence of a fault would, in practice, initiate one or two actions which are intended to interrupt the fault current. The first action would be to initiate the opening of a circuit breaker. If a solid-state circuit breaker, such as that seen in FIG. 2, is contained within the tap changer apparatus, this may be the only action required since a solid-state circuit breaker would open quickly enough to prevent damage to any of the SCRs assigned to tap changing. If all electromechanical circuit breaker is involved, however, the tap changing SCRs would need to be instructed to begin rotating the fault current promptly. This need is manifested by the long time required of electromechanical circuit breakers to interrupt fault current relative to a solid-state circuit breaker. In an economically viable realization failure to rotate the fault current through the tap-changing SCRs would result in irreparable damage to the SCRs because of thermal fatigue.

The essential features of fault current rotation call be explained in the context of FIG. 9, units 94a and 94b. Fault rotation could operate independently within these two units, or be coordinated, through the kernel of the idea remains unchanged. To begin, assume that device blocks b1 and b5 are conducting within unit 94a and device blocks b6 and b9 are conducting within unit 94b at the time a fault is detected. Within unit 94a, the gating commands to device blocks b1 and b5 would be immediately removed. At the next appropriate zero crossing of the line current, device block b3 (or device blocks b2 and b4) are gated. The gating command to device block b3 (or b2 and b4) would then be removed and applied to device blocks b2 and b4 (or b3). The rotation of the fault current among device blocks b1 and b5, b2 and b4, and b3 is continued in sequence as long as the fault current is present. Similarly, in block 94b, the fault current would rotate in sequence from device blocks b1 and b9 to blocks b7 and b10, and b8 and b11 before returning to blocks b6 and b9.

The rotation of the fault current is synchronized to the zero crossing of the line current, just as in normal tap-changer operation. Each unit of tap changer (94a and 94b in FIG. 9) needs to offer a minimum of three separate paths (b1 and b5, b2 and b4, and b3 in unit 94a) to the fault current to prevent the thermal overloading of the switching devices. The minimum requirement of three paths is based on the thermal characteristics of the switching devices for practical, economically viable implementations of this configuration. The exact number of paths for fault rotation in any given application could be more or less than 3, based on switching devices selected and the thermal capacity as a function of the rating of the inductive device.

While there has been shown and described what is considered at present to be the preferred embodiment of the present invention, it will be appreciated by those skilled in the art that modifications of such embodiment may be made. It is therefore desired that the invention not be limited to this embodiment, and it is intended to cover in the appended claims all such modifications as fall within the true spirit and scope of the invention.

We claim:

1. A tap changing system for operation with an inductive device, and including a reference potential comprising:

a tap changer winding having opposite ends and a plurality of tap winding sections, said tap winding sections having upper and lower end points, said tap changer winding being serially connectable with said inductive device and said reference potential;

individual first groups of gate-controlled electronic devices, having a first end and a second end, connected between said end points on the respective tap winding sections and said reference potential;

a separate, second group of gate-controlled electronic devices connected directly to the first end of said first groups of gate-controlled electronic devices and to said reference potential, said second group being more highly rated than said first group of gate-controlled electronic devices, said second group functioning normally in the ON-state;

said separate, second group acting as a circuit breaker under over-current conditions such that, within one-half cycle thereof, said second group is transferred to the OFF-state, whereby said tap changer winding is open circuited; and a control means for providing control signals to each of the respective gates of said gate-controlled electronic devices to control the states of combinations of said devices.

2. A system as defined in claim 1, in which the gate-controlled electronic devices are thyristors, and said inductive device is a transformer having a primary and a secondary winding.

3. A system as defined in claim 2, in which each group of said first groups and said second group of thyristors comprises a pair of thyristors, each one in the pair having a control gate; and said control means being operative for controlling the gates of each of the individual thyristors in selected combinations to produce variable turns ratios for said tap changer winding, whereby incremental tap voltage values are either added or subtracted with respect to an existing output voltage value.

4. A system as defined in claim 3, in which said control means provides control signals to selectively place certain ones of said first groups of thyristors in the conductive state at various times, while said second group of thyristors remains continuously in said conductive state until an over-current condition occurs.

5. A system as defined in claim 4, in which said control means is responsive to an over-current condition within one-half cycle thereof, so as to open circuit said first group by applying a control signal to said second group, thereby to place the second group in its OFF-state.

6. A tap changer system for coupling to an inductive device connected to a load, said tap changer system comprising:

a plurality of switches and an associated plurality of physical tap windings in a controlled configuration, said plurality of switches and associated plurality of physical tap windings to be connected to said inductive device;

control means for selecting at least two combinations of said switches in said controlled configuration to be gated into conducting states; and means for alternately gating said at least two combinations of said switches such that each combination of said switches and their associated physical tap windings is conducting for only selected time periods, such that a desired voltage magnitude is synthesized by the tap changer system intermediate to voltage magnitudes possible at said physical tap windings, said desired voltage magnitude comprising a voltage magnitude other than available at any physical tap winding of the tap changer system.

7. A system as defined in claim 6, wherein the inductive device has a modulation cycle, and in which each time period of said selected time periods that each combination of said at least two combinations comprises at least a portion of the modulation cycle of the inductive device, wherein said desired voltage magnitude comprises a magnitude intermediate a first voltage magnitude at a first tap winding terminal of the plurality of physical tap windings and a second voltage magnitude at a second tap winding terminal of the plurality of physical tap windings.

8. A tap changer system for coupling to an inductive device connected to a load, said inductive device operating at a modulation cycle, said tap changer system comprising:

a plurality of switches and a plurality of physical tap windings in a controlled configuration, said plurality of switches and plurality of physical tap windings to be connected to said inductive device;

control means for selecting at least two combinations of said switches to be gated into conducting states;

means for gating said at least two combinations such that each combination of said switches is conducting for a selected time period so that a desired non-physical tap voltage is synthesized with a value other than a voltage magnitude possible using any single physical tap winding or combination of physical tap windings.

9. The system as defined in claim 8, wherein said at least two combinations of said switches to be gated into conducting states of said plurality of switches connected to said inductive device comprise two separate switch units connected in parallel with a common node thereof coupled to said inductive device.

10. The system as defined in claim 9, wherein each switch unit comprises at least two switches of the plurality of switches.

11. The system as defined in claim 10, wherein said at least two switches of each switch unit are connected electrically in series.

12. A method for accommodating an overcurrent condition in an inductive device employing a switching system electrically coupled to the inductive device, said switching system comprising a plurality of switching units connected in parallel, said method comprising:

detecting the overcurrent condition in the inductive device; and during the overcurrent condition, rotating excess current due to the overcurrent condition through at least some switching units of the plurality of switching units connected in parallel.

13. The method of claim 12, wherein said rotating step includes activating during the overcurrent condition only one switching unit at a time of the plurality of switching units connected in parallel such that the excess current is rotated through said at least some switching units of the plurality of switching units.

14. The method of claim 13, wherein said activating of only one switching unit at a time is for a selected time period sufficiently short that the excess current passing therethrough will not cause thermal failure of said switching unit.

15. A load tap changing system for coupling to an inductive device, said load tap changing system comprising:

a plurality of switching units connected in parallel for electrical coupling to said inductive device;

multiple physical tap windings, each switching unit of at least some switching units of said plurality of switching units being connected to an associated physical tap winding of said multiple physical tap windings for controlling current therethrough; and control means for selectively activating said switching units such that said associated physical tap windings are selectively conducting and said load tap changing system provides said inductive device with a synthesized voltage magnitude having a value other than available at any physical tap winding of said multiple physical tap windings.

16. The load tap changing system of claim 15, wherein said synthesized voltage magnitude changes over time and said control means comprises means for selectively activating said switching units to ensure that the inductive device and the load tap changing system together provide at least one voltage control and harmonic control to a load coupled to said inductive device.

17. The load tap changing system of claim 15, wherein said control means comprises means for sequentially activating each switching unit of said plurality of switching units connected in parallel upon detection of an overcurrent condition in said inductive device such that current is rotated through each switching unit of the plurality of switching units electrically connected in parallel.

18. The load tap changing system of claim 15, wherein at least one switching unit of said plurality of switching units connected in parallel is unconnected to a physical tap winding of said multiple physical tap windings.

19. The load tap changing system of claim 15, wherein said plurality of switching units comprises a first plurality of switching units and wherein said load tap changing system comprises a second plurality of switching units connected in parallel, for electrical coupling to said inductive device, said first plurality of switching units and said second plurality of switching units being electrically coupled in series to said inductive device.

20. The load tap changing system of claim 19, wherein said multiple physical tap windings of said first plurality of switching units include a 1.25 percent tap winding and a 2.5 percent tap winding.

21. The load tap changing system of claim 20, further comprising another physical tap winding, said another physical tap winding being separate from said multiple physical tap windings and electrically connected to at least one switching unit of said second plurality of switching units, said another physical tap winding comprising a 6.25 percent tap winding.

22. The load tap changing system of claim 15, wherein each switching unit of said at least some switching units of said plurality of switching units comprises a pair of series connected, gate-controlled electronic devices, each series connected, gate-controlled electronic device pair having a common node, and wherein said associated physical tap winding of each switching unit of the at least some switching units is connected to said common node.

23. The load tap changing system of claim 22, wherein each physical tap winding of said multiple physical tap windings is electrically connected between common nodes of two series connected, gate-controlled electronic device pairs.

24. The load tap changing system of claim 23, wherein at least one switching unit of said plurality of switching units connected in parallel is unconnected to a physical tap winding of said multiple physical tap windings.

25. The load tap changing system of claim 23, wherein each gate-controlled electronic device comprises a thyristor.

26. A load tap changing system for coupling to an inductive device, said load tap changing system comprising:

a plurality of switching units connected in parallel for electrical coupling to said inductive device;

multiple physical tap windings, each switching unit of at least some switching units of said plurality of switching units being connected to an associated physical tap winding of said multiple physical tap windings for controlling current therethrough; and control means for selectively activating said switching units such that said associated physical tap windings are selectively conducting and said load tap changing system provides said inductive device with a desired voltage magnitude and polarity, wherein said control means comprises means for sequentially activating at least some switching units of said plurality of switching units connected in parallel upon detection of an overcurrent condition in said inductive device such that current is rotated through said at least some switching units of the plurality of switching units electrically connected in parallel.

27. The load tap changing system of claim 26, wherein said inductive device operates on a modulation cycle and said control means includes means for sequentially activating a different switching unit of said plurality of switching units connected in parallel with each half cycle of the modulation cycle of the inductive device upon detection of the overcurrent condition in said inductive device.

28. The load tap changing system of claim 26, wherein said inductive device operates on a modulation cycle and said control means includes means for sequentially activating a different switching unit of said plurality of switching units connected in parallel with each modulation cycle of the inductive device upon detection of the overcurrent condition in said inductive device.

29. A load tap changing system for coupling to an inductive device operating on a modulation cycle, said load tap changing system comprising:

a first physical tap winding and a second physical tap winding;

electronic switching devices electrically connected to said first physical tap winding and said second physical tap winding for controlling current therethrough, wherein said first physical tap winding and said second physical tap winding are selectively electrically coupled to said inductive device by appropriate actuating of said electronic switching devices; and a control circuit coupled to said electronic switching devices for selectively activating said electronic switching devices to synthesize an intermediate voltage magnitude, said intermediate voltage magnitude being intermediate a first voltage magnitude and a second voltage magnitude, said control circuit including means for controlling said electronic switching devices to selectively repetitively couple said first voltage magnitude and said second voltage magnitude to said inductive device over multiple modulation cycles thereof such that over said multiple modulation cycles said intermediate voltage magnitude is effectively synthesized and coupled to said inductive device, said intermediate voltage magnitude comprising a voltage magnitude other than available at any physical tap winding of said load tap changing system.

30. The load tap changing system of claim 29, wherein said intermediate voltage magnitude comprises a desired voltage magnitude, said desired voltage magnitude changing over time, and wherein said control circuit comprises means for selectively activating said electronic switching devices over different modulation cycles to achieve said desired voltage magnitude as said desired voltage magnitude changes over time.

31. The load tap changing system of claim 29, wherein said means for controlling the electronic switching devices comprises means for employing a modulation packet x modulation cycles in length, 'x' being $\geq 2$, in repetition to control said electronic switching devices over consecutive modulation cycles of said inductive device to produce said selective coupling of said first voltage magnitude and said second voltage magnitude to the inductive device over multiple modulation cycles such that the intermediate voltage magnitude is synthesized and coupled to the inductive device.

32. The load tap changing system of claim 31, wherein said means for controlling the electronic switching devices includes means for employing said modulation packet to produce within said 'x' modulation cycles a switching between said first voltage magnitude and said second voltage magnitude on consecutive modulation cycles, wherein repetition of said modulation packet produces an alternate coupling of the first voltage magnitude and the second voltage magnitude to the inductive device.

33. The load tap changing system of claim 32, wherein said first voltage magnitude is produced at said first physical tap winding and said second voltage magnitude is produced at said second physical tap winding.

34. The load tap changing system of claim 31, wherein said means for controlling the electronic switching devices includes means for employing said modulation packet to selectively couple the first voltage magnitude, the second voltage magnitude and at least one additional voltage magnitude to the inductive device within said 'x' modulation cycles.

35. The load tap changing system of claim 31, wherein said modulation packet comprises a first modulation packet and wherein said means for controlling the electronic switching devices includes means for employing a second modulation packet in combination with said first modulation packet to selectively couple at least said first voltage magnitude and said second voltage magnitude to said inductive device in two different repeating sequences, thereby synthesizing over time said intermediate voltage magnitude for the inductive device.

36. The load tap changing system of claim 35, wherein said second modulation packet is also 'x' modulation cycles in length, wherein 'x'$\geq 2$.

37. The load tap changing system of claim 35, wherein said second modulation packet is 'y' modulation cycles in length, wherein 'y'$\geq 2$ and 'y'$\neq$'x'.

38. The load tap changing system of claim 35, wherein said means for controlling the electronic switching devices includes means for employing the first modulation packet and the second modulation packet in any repeating sequence.

39. The load tap changing system of claim 35, wherein said means for controlling the electronic switching devices includes means for employing the first modulation packet and the second modulation packet to mitigate harmonics or generate a desired level of harmonics in said intermediate voltage magnitude effectively coupled to the inductive device.

40. A load tap changing system for coupling to an inductive load, said load tap changing system comprising:

current sensing means for detecting an overcurrent condition in the inductive device;

a plurality of switching units connected in parallel for electrical coupling to said inductive device; and control means for selectively activating said switching units for conducting current therethrough, wherein said control means includes means for sequentially activating each switching unit of said plurality of switching units connected in parallel such that the overcurrent condition is rotated through each switching unit of the plurality of switching units when said plurality of switching units are electrically coupled to said inductive device.

41. The load tap changing system of claim 40, wherein at least one switching unit of said plurality of switching units comprises a thyristor, said thyristor being sized smaller than necessary to accommodate the overcurrent condition for full duration thereof, said control means for selectively activating comprising means for protecting said thyristor by activating said thyristor for only a limited time interval during said overcurrent condition before switching said overcurrent through a different switching unit of said plurality of switching units connected in parallel, thereby maintaining temperature of the thyristor below a critical level for damage thereof.

42. The load tap changing system of claim 40, wherein said inductive device operates on a modulation cycle, and wherein each switching unit of said plurality of switching units coupled in parallel comprises a thyristor capable of being switched at half-cycle intervals of said modulation cycle, and wherein said control means includes means for sequentially activating said thyristors for half cycle intervals such that overcurrent is sequentially rotated on both positive and negative half cycles of the modulation cycle, thereby minimizing heat resulting from passing of the overcurrent through each individual thyristor.

43. A method for synthesizing a desired voltage magnitude for an inductive device operating on a modulation cycle, the method employing a load tap changing system having at least a first physical tap winding and a second physical tap winding, said desired voltage magnitude comprising a voltage magnitude other than available at any physical tap winding of the load tap changing system, said method comprising:

(a) a step of providing to the inductive device over consecutive modulation cycles a sequence of a first voltage magnitude and a second voltage magnitude employing the first physical tap winding and the second physical tap winding; and (b) a step of repeating said providing step over multiple modulation cycles to synthesize over time a third voltage magnitude for the inductive device, said third voltage magnitude being other than said first voltage magnitude and said second voltage magnitude, said third voltage magnitude comprising said desired voltage magnitude.

44. The method of claim 43, wherein said providing step includes employing a modulation packet to provide the sequence of first voltage magnitude and second voltage magnitude in consecutive modulation cycles, and wherein said repeating step comprises repeating said providing step to synthesize the third voltage magnitude to comprise a voltage magnitude intermediate the first voltage magnitude and the second voltage magnitude.

45. The method of claim 44, wherein said providing step includes employing the modulation packet to alternately provide the first voltage magnitude and the second voltage magnitude to the inductive device.

46. The method of claim 43, wherein said providing step further comprises producing said first voltage magnitude from said first physical tap winding and said second voltage magnitude from said second physical tap winding.

47. The method of claim 43, wherein said providing step comprises providing the first voltage magnitude and the second voltage magnitude along with at least one additional voltage magnitude in said sequence over consecutive modulation cycles.

48. The method of claim 43, wherein said providing step includes employing a first modulation packet and a second modulation packet in combination, said first modulation packet and said second modulation packet each providing one sequence of coupling at least the first voltage magnitude and the second voltage magnitude to the inductive device, and wherein said repeating step includes repeating employing of said first modulation packet and said second modulation packet such that over time said third voltage magnitude is synthesized and coupled to the inductive device.

49. The method of claim 48, wherein said first modulation packet is 'x' modulation cycles in length and said second modulation packet is 'y' modulation cycles in length, wherein 'x'≧2 and 'y'≧2.

50. The method of claim 48, wherein said 'x' modulation cycles of said first modulation packet comprises a different number of modulation cycles than said 'y' modulation cycles of said second modulation packet.

51. A tap changer winding-switching configuration comprising:

at least three pairs of gate-controlled devices coupled in parallel, said pairs having respective first, second and third common nodes, within each pair each common node being disposed between the gate-controlled devices of said pair;

a first tap winding, having a first voltage magnitude, connected between said first and second common nodes, and a second tap winding, having a second voltage magnitude, connected between said second and third common nodes; and control means for switching said gate-controlled devices to select said first and second tap windings in additive and subtractive combination thereof.

\* \* \* \* \*

UNITED STATES PATENT AND TRADEMARK OFFICE
CERTIFICATE OF CORRECTION

PATENT NO. : 5,604,423
DATED : Feb. 18, 1997
INVENTOR(S) : Degeneff et al.

It is certified that error appears in the above-identified patent and that said Letters Patent is hereby corrected as shown below:

Title page, item
[22] Filed:    "Apr. 6, 1995" should be --Apr. 6, 1994--.

Column 1, line 7    "Oct. 26, 1995" should be --Oct. 26, 1992--.

Signed and Sealed this

Twentieth Day of October, 1998

Attest:

BRUCE LEHMAN

*Attesting Officer*    *Commissioner of Patents and Trademarks*